(12) United States Patent
Kim

(10) Patent No.: US 11,147,408 B2
(45) Date of Patent: Oct. 19, 2021

(54) AUTOMATIC COOKING POT NOTIFYING COMPLETION OF COOKING AND HAVING A POWER SWITCH IN SYNC WITH A CLOSING WING OR KNOB PROTRUSION FOR SELECTIVELY WATERPROOFING A SOUND PASSAGE HOLE

(71) Applicant: Kyung-Hee Kim, Yongin (KR)

(72) Inventor: Kyung-Hee Kim, Yongin (KR)

(*) Notice: Subject to any disclaimer, the term of this patent is extended or adjusted under 35 U.S.C. 154(b) by 0 days.

(21) Appl. No.: 14/779,050

(22) PCT Filed: Mar. 24, 2014

(86) PCT No.: PCT/KR2014/002430
§ 371 (c)(1),
(2) Date: Sep. 22, 2015

(87) PCT Pub. No.: WO2014/148873
PCT Pub. Date: Sep. 25, 2014

(65) Prior Publication Data
US 2016/0037955 A1 Feb. 11, 2016

(30) Foreign Application Priority Data
Mar. 22, 2013 (KR) .................. 10-2013-0030740

(51) Int. Cl.
*A47J 27/04* (2006.01)
*A47J 27/62* (2006.01)
*A47J 27/57* (2006.01)

(52) U.S. Cl.
CPC .............. *A47J 27/04* (2013.01); *A47J 27/57* (2013.01); *A47J 27/62* (2013.01); *A47J 2027/043* (2013.01)

(58) Field of Classification Search
CPC .................................. H01H 9/04; H01H 19/06
(Continued)

(56) References Cited

U.S. PATENT DOCUMENTS 4,345,145 A * 8/1982 Norwood ............ A47J 37/0623
219/408
5,079,407 A * 1/1992 Baker ................... F24C 15/106
219/445.1
(Continued)

FOREIGN PATENT DOCUMENTS

CN 2102699 U 4/1992
CN 1710338 A 12/2005
(Continued)

OTHER PUBLICATIONS

International Search Report for PCT/KR2014/002430 dated Jul. 22, 2014.

*Primary Examiner* — Christopher M Koehler
*Assistant Examiner* — Spencer H. Kirkwood
(74) *Attorney, Agent, or Firm* — STIP Law Group, LLC

(57) ABSTRACT

The present invention relates to an automatic cooking pot notifying the completion of cooking. More specifically, provided is an automatic cooking pot which has a function of automatically notifying the optimal completion of a broth-based food, which retains a broth even when cooking is completed. Furthermore, if a user puts ingredients into the pot before the water boils, and selects a cooking menu wherein the same boiling time duration is set for the same menu regardless of the amount of food, the automatic cooking pot provided herewith notifies the user when the cooking is completed. In another embodiment, the user may adjust the boiling time duration to be set on a timer unit for the same food within a certain time range according to the amount of the food, on the basis of the variation in data in the boiling time durations depending on the amount of the food which have been measured through experiments beforehand.

3 Claims, 17 Drawing Sheets

(58) Field of Classification Search
USPC .......................................... 200/302.1; 99/344
See application file for complete search history.

(56) References Cited

U.S. PATENT DOCUMENTS

| | | | | |
|---|---|---|---|---|
| 5,441,344 | A * | 8/1995 | Cook, III | A47J 43/28 374/141 |
| 5,555,536 | A * | 9/1996 | Rolf | G04G 13/02 340/309.7 |
| 5,567,458 | A * | 10/1996 | Wu | A47J 27/004 219/433 |
| 5,699,721 | A * | 12/1997 | Funke | A47J 29/02 99/336 |
| 5,937,741 | A * | 8/1999 | Manger | A47J 27/18 99/336 |
| 6,236,025 | B1 * | 5/2001 | Berkcan | G05D 23/27535 219/483 |
| 6,449,218 | B1 * | 9/2002 | Lluch | A61J 7/0007 221/3 |
| 2003/0167930 | A1 * | 9/2003 | Narcissi | A47J 27/0817 99/339 |
| 2005/0028678 | A1 | 2/2005 | Baraille et al. | |
| 2006/0196057 | A1 * | 9/2006 | So | A47J 43/283 30/322 |
| 2006/0273895 | A1 * | 12/2006 | Kollin | G08B 1/08 340/539.17 |
| 2011/0044370 | A1 * | 2/2011 | Schochet | A47J 43/283 374/155 |

FOREIGN PATENT DOCUMENTS

| | | | |
|---|---|---|---|
| CN | 201562147 U | 8/2010 | |
| CN | 102458198 A | 5/2012 | |
| CN | 102665154 B * | 4/2015 | |
| DE | 4439096 A1 * | 5/1996 | ............. A47J 27/62 |
| JP | 57200855 A * | 12/1982 | ............. G01N 29/00 |
| JP | 10-005124 A | 1/1988 | |
| JP | 1988063414 A | 3/1988 | |
| JP | 1990045021 A | 2/1990 | |
| JP | 1992303404 A | 10/1992 | |
| JP | 1998005124 A | 1/1998 | |
| JP | 2012528658 A | 11/2012 | |
| KR | 19920017615 A | 10/1992 | |
| KR | 10-1993-0001778 B1 | 3/1993 | |
| KR | 19930001778 B1 | 3/1993 | |
| KR | 10-1999-0005373 A | 1/1999 | |
| KR | 1999005373 A | 1/1999 | |
| KR | 20-1999-0036185 U | 9/1999 | |
| KR | 200178604 Y1 | 4/2000 | |

\* cited by examiner

AUTOMATIC COOKING POT NOTIFYING COMPLETION OF COOKING AND HAVING A POWER SWITCH IN SYNC WITH A CLOSING WING OR KNOB PROTRUSION FOR SELECTIVELY WATERPROOFING A SOUND PASSAGE HOLE

CROSS-REFERENCE TO RELATED APPLICATIONS

This application is the U.S. National Phase under 35 U.S.C. § 371 of International Application No. PCT/KR2014/002430, filed on Mar. 24, 2014, which in turn claims the benefit of Korean Application No 10-2013-0030740, filed on Mar. 22, 2013, the disclosures of which are incorporated by reference into the present application.

TECHNICAL FIELD

The present invention relates to an automatic cooking pot with a function of notifying a completion of a cooking to a user when a broth food cooking is completed optimum.

BACKGROUND ART

There is a pot with a conventional timer wherein a predetermined time is manually set before a user cooks in such a way to dispose a timer means at a conventional cooking pot, thus generating an alarm sound after the set time passes. In this case, the user cannot know the time that the cooking is completed when using a timer-attached cooking pot wherein only a timer is just installed, so it is hard to set an accurate time on the timer if it needs to set an alarm sound notifying the completion of cooking.

In order to resolve the above-mentioned problems, the inventor of the present application discloses, as another conventional technology, the cooking device (patent document 1) whose Korean patent registration number is 10-0070983. The above patent document 1 discloses only a temperature sensor, two timers, and an alarm circuit, which is hard to apply to the present invention because the above invention may not be used for a broth food cooking wherein broth should remain after the completion of the cooking. More specifically, it is directed to the technology for a pressure rice cooker related with rice cooking wherein any broth does not remain after the completion of the cooking, which may well apply to a rice cooking pot that necessarily requires a predetermined simmering process. The above mentioned technology is not appropriate to use for the purpose of a broth food cooking automatic alarming of the present invention which does not require any simmering procedure.

In another conventional technology, the inventor of the present application discloses a pot (patent document 2) whose Korean utility model registration number is 20-0178604. The patent document 2 is configured in such a way that one timer, a manual operation switch for starting the timer and an alarm circuit are disposed inside the handles of a pot. A user inputs a ramen which is a cooking material after visually checking that water in the pot is boiling, and starts the built-in timer by manually operating the switch. A boiling sustainment time until the broth food cooking is completed from the input of the ramen cooking material which in general is inputted after the boiling of water is experimentally measured. The thusly measured time is set on the timer. To this end, an alarm sound may be generated after the time set on the timer passes.

However, the above patent document 2 has an inconvenience during the use in the way that it needs to operate the switch, of which the timer is manually operated, after the user checks in person the boiling of water in the port after the user heats the water in the pot. If the user forgets to start the switch having a function of starting the timer, there will be not any alarm sound to notify the completion of the cooking. For this reason, the user should input a ramen which is a cooking material, after water is boiled, whereupon the user should stay near the cooking device until the water boils, while frequently visiting and checking if water is boiling, thus causing a lot of inconvenience when in use.

DISCLOSURE OF INVENTION

Technical Problem

Accordingly, it is an object of the present invention to provide an automatic cooking pot which is able to automatically notify when a broth food (a food the cooking of which is completed with broth remaining) cooking is optimally completed.

It is another object of the present invention to provide an automatic cooking pot automatically notifying the completion of cooking wherein a cooking material is inputted before water boils, and then a cooking menu is selected.

It is further another object of the present invention to provide an automatic cooking pot wherein in the above method, the same boiling sustainment time is set for the same menu irrespective of the amount of cooking, but according to another application method, the sustainment time of boiling set on a timer unit on the basis of the amount of cooking on the same menu can be adjusted based on a changing data in the boiling sustainment time depending on the previously and experimentally measured amount within a predetermined time range.

In another aspect of the present invention, it is still further another object of the present invention to provide a pot wherein a menu is selected, and the selection is detected when water boils, thus generating a boiling alarm sound to notify an input time of a cooking material, and after the water boils, the cooking material is inputted, thus automatically notifying the completion of the cooking.

According to still another aspect of the present invention, it is still further another object of the present invention to provide a pot wherein a signal is generated, which notifies the boiling of water in a pot, and a cooking material is inputted in accordance with the signal, and a button is operated to notify the input of the cooking material, thus automatically alarming after the cooking is completed.

Solution to Problem

To achieve the above objects, there is provided an automatic cooking pot notifying the completion of cooking wherein a menu selection unit 16 which allows to select a cooking menu is configured in such a way that a "boiling sustainment time" of the selected menu during operation is set on a timer unit 9 irrespective of the amount of cooking. There is provided a boiling detection unit 10 to detect the boiling of a water 17 in a pot 1. When the boiling detection unit 10 detects boiling, the timer unit 9 starts to operate. When the set time of the timer unit 9 passes, an alarm sound is generated. When a cooking menu is selected after a cooking material is previously inputted before water boils, an alarm sound to notify the completion of cooking may be outputted when the cooking is completed after heating.

In another application of the above method, in another method, the boiling sustainment time of the selected menu set on the timer unit 9 based on the amount of cooking may be adjusted based on the change data in the time based on a previously and experimentally measured amount of cooking.

In further another method, there is provided a menu selection unit 16 wherein a "boiling sustainment time" on the menu selected irrespective of the amount of cooking when selecting a menu may be set on a timer unit 9. In addition, there is provided a boiling detection unit 10 wherein a boiling alarm sound is outputted when detecting a boiling to inform an input time of cooking material, and at the same time the timer unit 9 starts to operate, and as the boiling alarm sound is outputted, when the set time of the timer unit passes with the cooking material being inputted, a cooking completion sound can be outputted, which notifies the completion of the cooking. To this end, an automatic alarming can be possible when the cooking is completed since the cooking material is inputted based on a boiling signal sound of water.

In still further another method, there is provided a menu selection unit 16 wherein a "boiling sustainment time" selected in irrespective of the amount of cooking is set on a timer unit when selecting menu. In addition, there is provided a boiling detection unit 10 wherein a boiling sound can be generated, which notifies a material input time if the boiling is detected. As a material input button 19 configured to notify a material input is operated after a cooking material is inputted in accordance with the boiling sound, a sound which notifies the completion of the cooking can be outputted after the cooking is completed optimum.

Advantageous Effects

The present invention is convenient when in use because the completion of a cooking can be notified in such a way to output an alarm sound notifying the completion of a cooking when the cooking is completed, after a cooking menu is selected with a cooking material being previously inputted before water boils. In particular, in case of a ramen cooking among the broth food cooking, a ramen can be previously inputted before water boils, thus enhancing convenience when in use.

According to another example of an occasion wherein a cooking material is previously inputted before water boils, a boiling time can be automatically adjusted on the basis of the amount of cooking.

As an effect of still further embodiment of the present invention, even in case of an occasion wherein a cooking material is inputted after water boils, an input time of a cooking material can be notified, thus obtaining convenience when in use, and the completion of a cooking after the cooking is completed can be effectively notified using an alarm sound.

[Legend of Reference Numbers]

Figure 1:
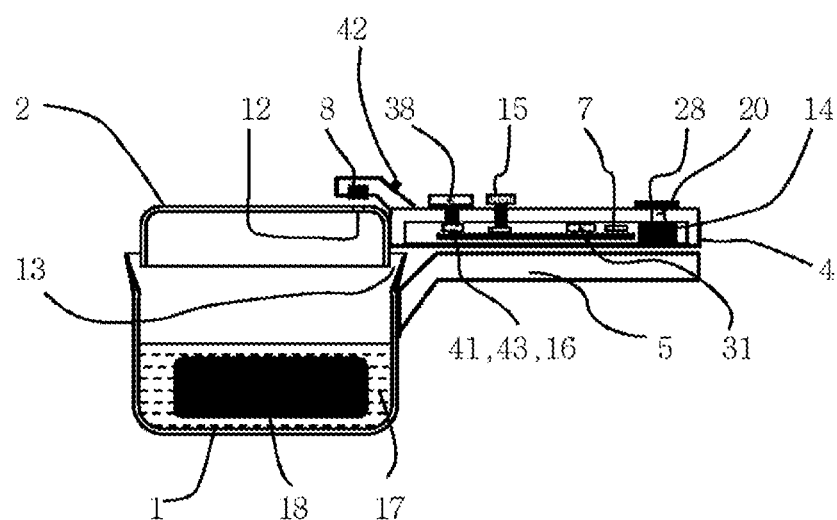
FIG. 1 is a side cross sectional view illustrating a configuration wherein a temperature sensor is configured to detect the temperature of vapor erupting from a vapor erupting port according to a first exemplary embodiment of the present invention.

| | | |
|---|---|---|
| 1: Pot | 2: Upper lid | 3: Pot body |
| 4: Upper lid side handles | | 5: Body handles |
| 6: Upper lid center handles | | 7: Power unit |
| 8: Temperature sensor | | |
| 9: Timer unit | | 10: Boiling detection unit |
| 11: Sound generation unit | | |
| 12: Vapor erupting port | | 13: Gap |
| 14: Speaker | | |
| 15: Cooking adjusting means | | 16: Menu selection unit |
| 17: Water | | |
| 1: Cooking material | | 19: Material input button |
| 20: Sound passage hole | | |
| 21: Menu plate | | |
| 22: Cooking amount selection switch | | 23: Spring |
| 24: Protrusion groove | | 25: Protrusion |
| 26: Rubber ring | | |
| 27: Handle fixing female handles | | 28: Thin plate |
| 29: Handle upper structure | | |
| 30: Know lower structure | | 31: Circuit unit |
| 32: Bolt | | 33: Detection unit |
| 34: Threaded groove | | 35: Sensor wing fixing bolt |
| 36: Temperature sensor wing | | |
| 37: Handle fixing bolt | | 38: Knob |
| 39: Knob wing | | |
| 40: Detection unit engaging screw | | 41: Variable resistor |
| 42: Power indication LED | | |
| 43: Power switch | | 44: Menu selection button |
| 45: Cooking adjusting button | | |
| 46: Menu indication LED | | |
| 47: Cooking adjusting indication LED | | |
| 48: Cooking amount detection unit | | 49: Knob protrusion plate |

BEST MODES FOR CARRYING OUT THE INVENTION

In the present invention, there is provided an automatic cooking pot notifying the completion of cooking wherein a menu selection unit 16 which allows to select a cooking menu is configured in such a way that a "boiling sustainment time" of the selected menu during operation is set on a timer unit 9 irrespective of the amount of cooking. There is provided a boiling detection unit 10 to detect the boiling of a water 17 in a pot 1. When the boiling detection unit 10 detects boiling, the timer unit 9 starts to operate. When the set time of the timer unit 9 passes, an alarm sound is generated. When a cooking menu is selected after a cooking material is previously inputted before water boils, an alarm sound to notify the completion of cooking may be outputted when the cooking is completed after heating.

In another application of the above method, in another method, the boiling sustainment time of the selected menu set on the timer unit 9 based on the amount of cooking may be adjusted based on the change data in the time based on a previously and experimentally measured amount of cooking.

In further another method, there is provided a menu selection unit 16 wherein a "boiling sustainment time" on the menu selected irrespective of the amount of cooking when selecting a menu may be set on a timer unit 9. In addition, there is provided a boiling detection unit 10 wherein a boiling alarm sound is outputted when detecting a boiling to inform an input time of cooking material, and at the same time the timer unit 9 starts to operate, and as the boiling alarm sound is outputted, when the set time of the timer unit passes with the cooking material being inputted, a cooking completion sound can be outputted, which notifies the completion of the cooking. To this end, an automatic alarming can be possible when the cooking is completed since the cooking material is inputted based on a boiling signal sound of water.

In still further another method, there is provided a menu selection unit 16 wherein a "boiling sustainment time" selected in irrespective of the amount of cooking is set on a timer unit when selecting menu. In addition, there is provided a boiling detection unit 10 wherein a boiling sound can be generated, which notifies a material input time if the boiling is detected. As a material input button 19 configured to notify a material input is operated after a cooking material is inputted in accordance with the boiling sound, a sound which notifies the completion of the cooking can be outputted after the cooking is completed optimum.

MODES FOR CARRYING OUT THE INVENTION

First Exemplary Embodiment

The first exemplary embodiment of the present invention is directed to an embodiment wherein a cooking material is previously inputted before water boils, and an alarm sound is automatically outputted when the cooking is completed. The configuration of the first exemplary embodiment of the present invention is as follows.

Figure 14:
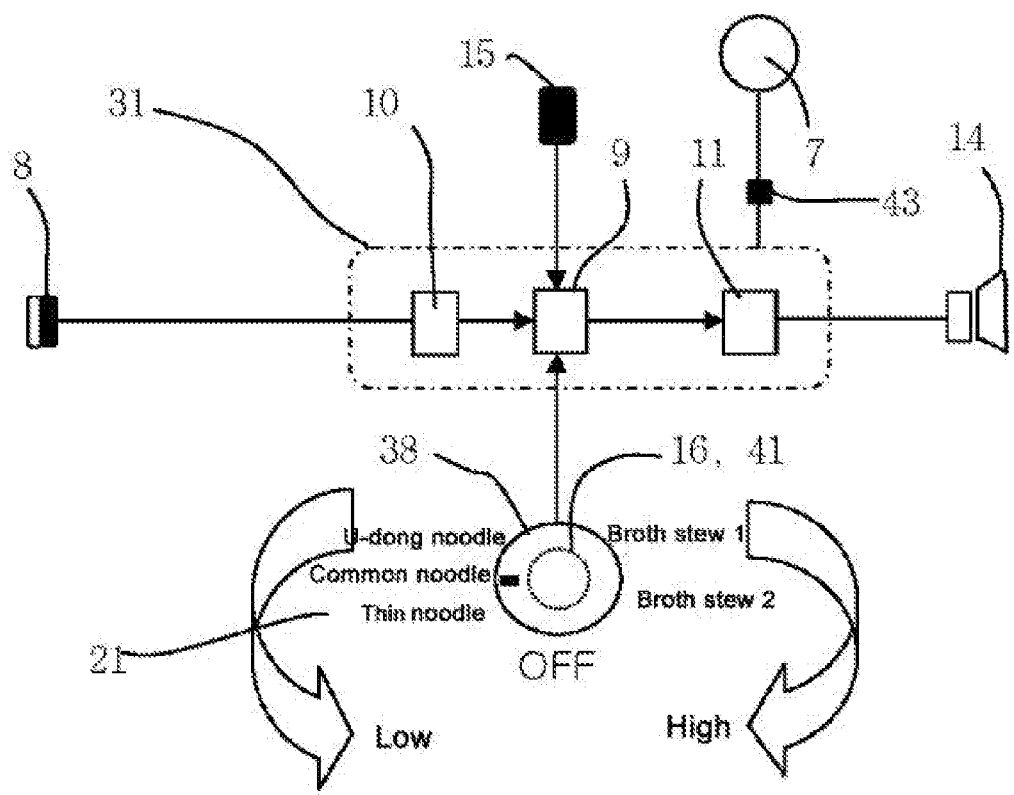
FIG. 14 is a view illustrating a circuit configuration according to the first and second exemplary embodiments of the present invention.

The first embodiment of the present invention may include, but is not limited to, a boiling detection unit 10 which is formed of a temperature sensor 8 and is configured to output a signal when the boiling of water 17 in a pot 1 is detected; a timer unit 9 wherein it operates in accordance with an output signal when the boiling is detected by the boiling detection unit 10, and a "boiling sustainment time 1" (time from the boiling detection to the completion of the cooking with a cooking material being previously inputted) of the menu selected by the menu selection unit 16 is set, and the set time value is adjusted by the cooking adjusting unit 15, and when the set time passes, a signal is outputted; a sound generation unit 11 which is configured to generate in accordance with an output signal of the timer unit 9 and has a speaker 14 and a sound passage hole 20; and a power unit 7 which is configured as in FIG. 14 and is installed inside an upper side handle 4 or an upper lid center handle 6 of the pot 1. (refer to FIGS. 1 to 10, 14, 18 and 20.)

Second Exemplary Embodiment

The second exemplary embodiment of the present invention is an embodiment wherein the menu is selected, and the boiling of the water 17 is notified in a form of sound, and when the cooking material 18 is inputted based on the boiling sound, the alarm can be automatically generated after the completion of the cooking. The configuration thereof is as follows.

The second exemplary embodiment of the present invention may include, but is not limited to, a temperature sensor 8 which is formed of a boiling detection unit 10 configured to output a signal when the boiling of the water 17 in the pot 1 is detected; a timer unit 9 wherein the time obtained by adding a "boiling sustainment time 2" (time from the input of a cooking material in boiling water to the completion of the cooking) of the menu selected by the menu selection unit 16 to the "input lead time" of the cooking material is set, and the set time value is adjusted by the cooking adjusting unit 15, and the operation starts in accordance with a signal of the boiling detection unit 10, and when the set time passes, a signal is outputted; a sound generation unit 11 wherein a boiling sound is generated based on an output signal a boiling is detected by the boiling detection unit 10, and when a set time of the timer unit 9 passes, a cooking completion sound is outputted in accordance with an output signal, and it equips with a speaker 14 and a sound passage hole 20; and a power unit 7 which is installed inside an upper lid side handle 4 or an upper lid center handle 6 of the pot 1 (refer to FIGS. 1 to 10, 14, 18 and 20.)

In the above configuration, the "input lead time" is about 20 to 30 seconds for a ramen cooking. The time is determined with an average measurement time value obtained from multiple persons.

The time set on the timer unit 9 is a time obtained by adding the "input lead time" to the "boiling sustainment time 2" for each menu, but the time actually is a "boiling sustainment time 2" (the sustainment time from the input of the cooking material in a boiling water to the completion of the cooking) of a corresponding menu.

In the above configuration, the timer unit 9, which is in operation, may be configured to restart in accordance with an operation signal from a restart button (not illustrated).

Third Exemplary Embodiment

The third exemplary embodiment of the present invention is directed to an embodiment wherein there is provided a manually operable material input button 19 which is configured to notify to the circuit unit 31 the inputs of the cooking material 18 after the cooking material 18 is inputted in the water 17 wherein when the water 17 is boiling in the pot 1, it is detected and is notified in a form of sound. The configuration of the third exemplary embodiment is as follows.

Figure 15:
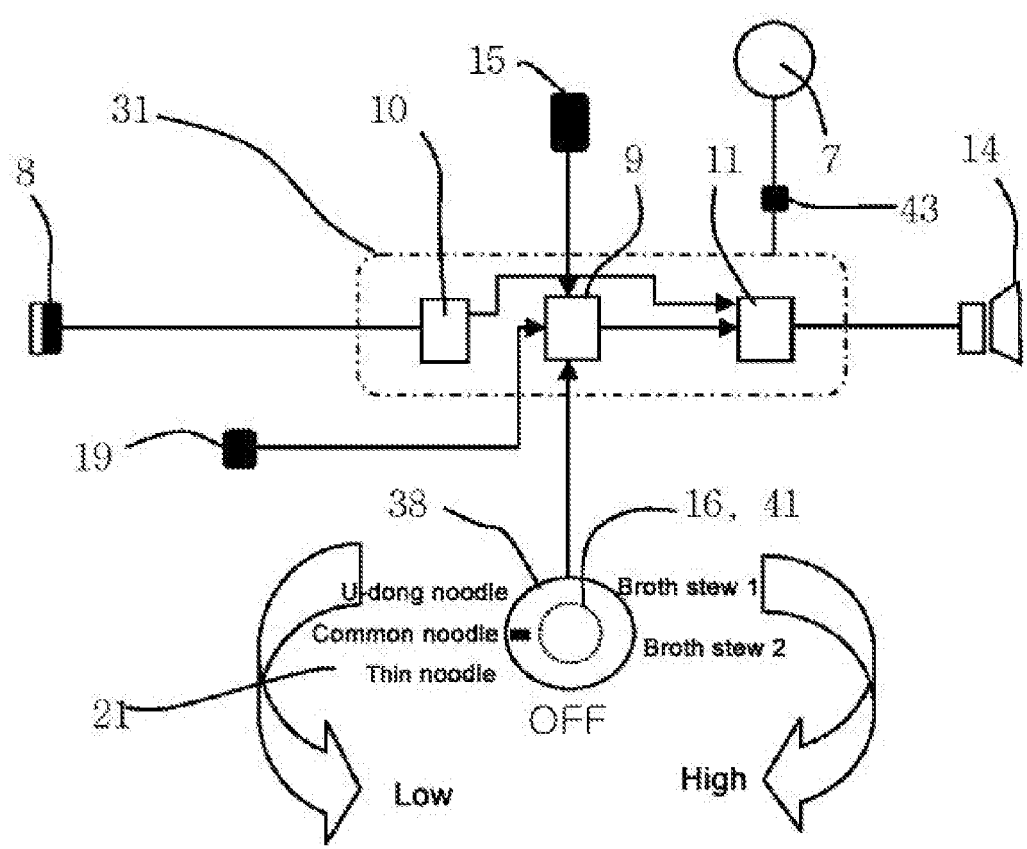
FIG. 15 is a view illustrating another circuit configuration according to a third exemplary embodiment of the present invention wherein a material input button is installed.

The third exemplary embodiment may include, but is not limited to, a temperature sensor 8 which is formed of a boiling detection unit 10 configured to output a signal when the boiling of water 17 in the pot 1 is detected; a timer unit 9 wherein a "boiling sustainment time 2" (time from the input of the cooking material into a boiling water to the completion of the cooking) of the menu selected by the menu selection unit 16 is set, and the set time value is adjusted by the cooking adjusting unit 15, and when an operation signal of the material input button 19 is generated, the boiling signal of the boiling detection unit 10 is checked again, and if a boiling signal is detected, the operation starts, and when the set time passes, a signal is outputted; a sound generation unit 11 wherein a boiling sound is generated in accordance with an output signal when the boiling is detected by the boiling detection unit 10 and a cooking completion sound is generated in accordance with an output signal when the set time of the timer unit 9 passes, and it equips with a speaker 14 and a sound passage hole 20, and a power unit 7 which is formed as in FIG. 15 and is installed inside an upper lid side handle 4 or an upper lid center handle 6 of the pot 1 (refer to FIGS. 1 to 10, 15, 19 and 21).

Fourth Exemplary Embodiment

The fourth exemplary embodiment of the present invention is an embodiment wherein a cooking amount detection unit 48 is provided for a user to detect the amount of a cooking or to instruct the amount of the cooking. The circuit configuration of the fourth exemplary embodiment is as follows.

Figure 20:
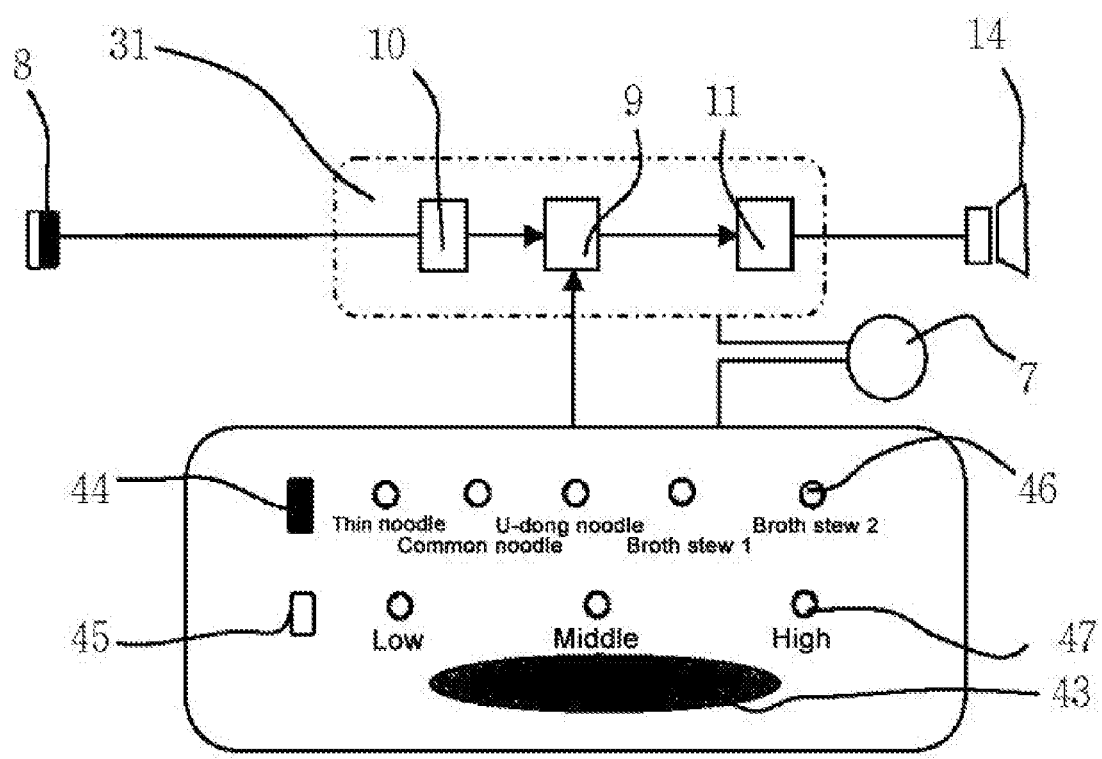
FIG. 20 is a view illustrating a circuit configuration when the first and second exemplary embodiments of the present invention are formed of a microcomputer.
Figure 21:
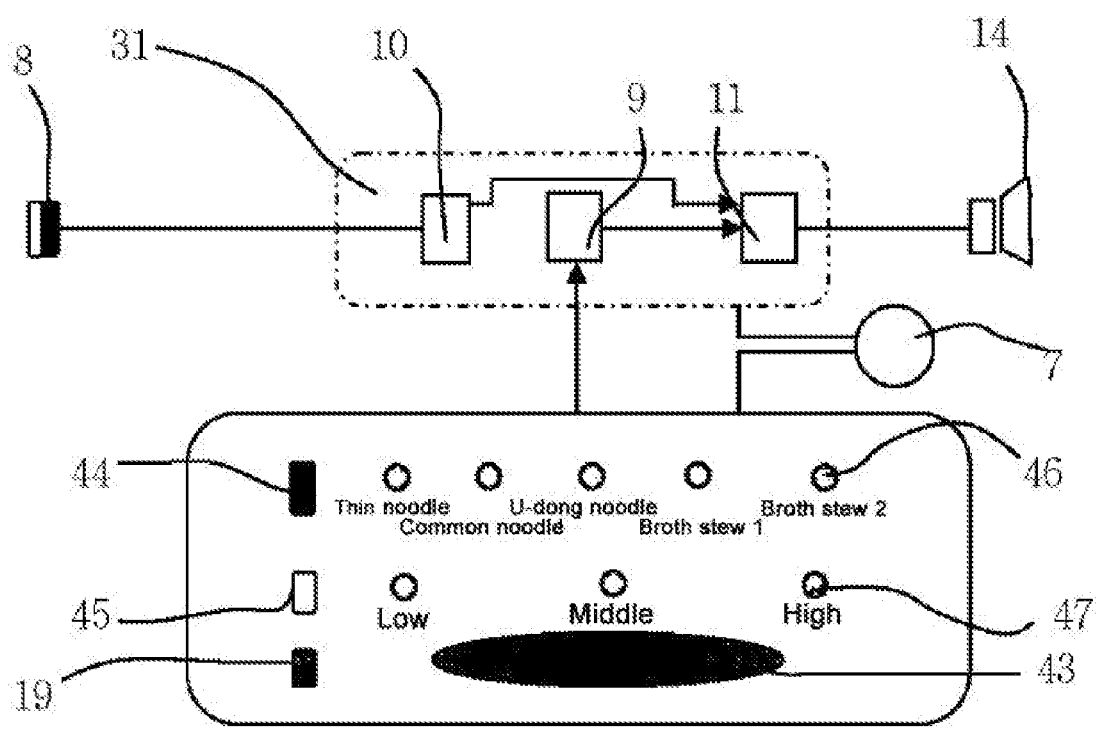
FIG. 21 is a view illustrating a circuit configuration wherein a third exemplary embodiment of the present invention is formed of a microcomputer.
Figure 22:
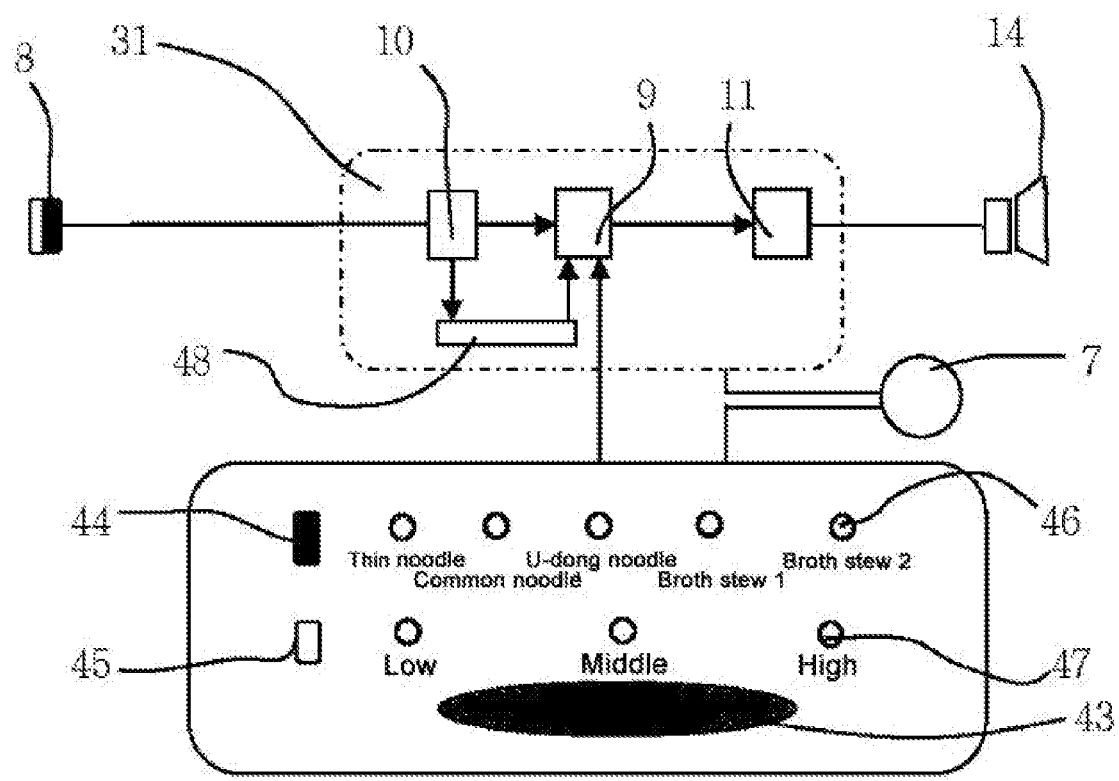
FIG. 22 is a view illustrating a circuit configuration wherein a fourth exemplary embodiment of the present invention having a cooking amount detection unit is formed of a microcomputer.
Figure 23:
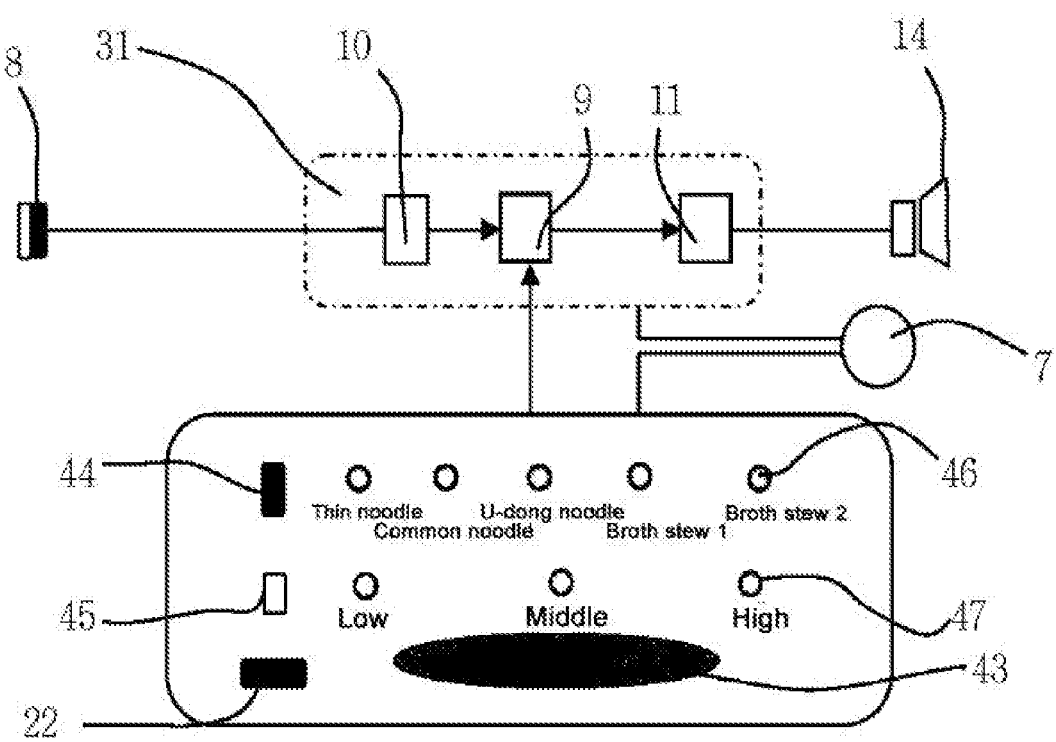
FIG. 23 is a view illustrating a circuit configuration wherein a fourth exemplary embodiment of the present invention is formed of a microcomputer in case where a cooking amount detection unit is formed of a cooking amount selection switch according to the present invention.

In the above embodiment, there are provided a cooking amount detection unit 48 which is configured to measure the total estimated time from the moment the power switch 43 manually operated at the start of heating of the cooking is turned on to when the boiling detection unit 10 outputs a boiling detection signal; a boiling detection unit 10 which outputs a signal when the boiling is detected; a timer unit 9 wherein it starts operation in accordance with an output signal from the boiling detection unit 10, and a "boiling sustainment time 1" (time from the boiling detection with a cooking material being previously inputted to the completion of the cooking) of the menu selected by the menu selection unit 16 is set, and the set time value is adjusted by the cooking adjusting unit 15, and when the set time passes, a cooking completion signal is outputted; a sound generation unit 11 configured to generate a sound in accordance with an output signal of the timer unit Sand having a speaker 14 and a sound passage hole 20; and a power unit 7 which is configured as in FIG. 20 and is installed inside an upper lid side handle 4 of the pot 1 or an upper lid center handle 6 of the pot 1 (refer to FIGS. 1 to 10, 16, 17, 22 and 23).

Figure 16:
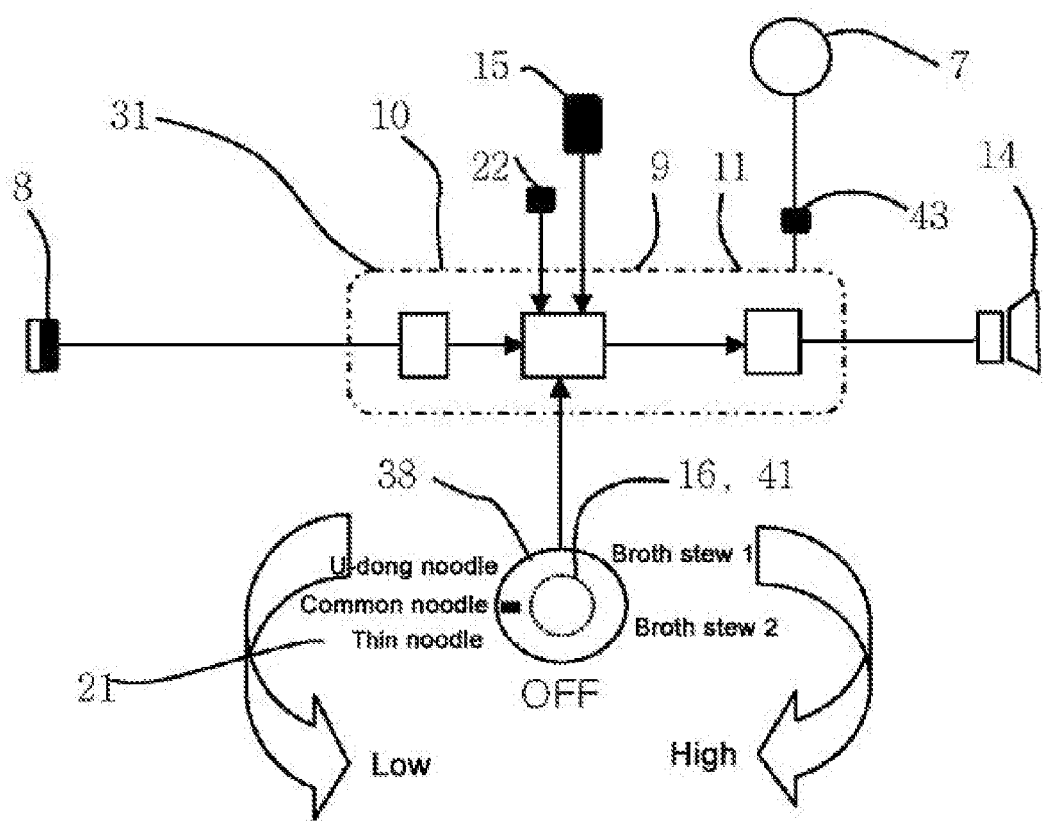
FIG. 16 is a view illustrating further another circuit configuration according to a fourth exemplary embodiment of the present invention wherein a cooking amount selection switch is installed.
Figure 17:
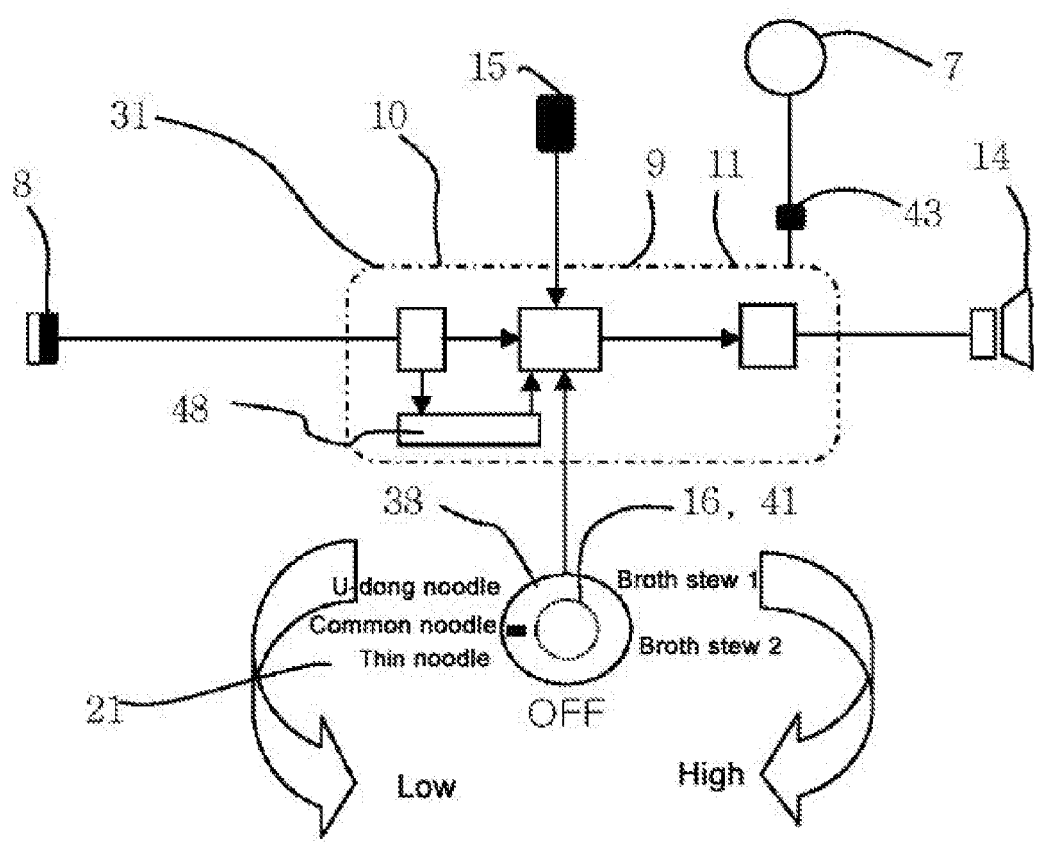
FIG. 17 is a view illustrating still further another circuit confirmation according to a fourth exemplary embodiment of the present invention wherein a cooking amount detection unit is installed so as to measure time until boiling.

In the configuration according to the fourth exemplary embodiment,

As illustrated in FIG. 16, the cooking amount detection unit 48 may be formed of a cooking amount selection switch 22. In this case, the setting time of the timer unit 9 may be adjusted based on the previously experimentally measured data in accordance with a contact point signal of the cooking amount selection switch 22 instead of measuring the time from the supply of the power to the boiling.

In the configurations of the first, second, third and fourth exemplary embodiments of the present invention which have been described above, the power switch 43 may be arranged integral with a variable resistor 41, thus operating in sync with the variable resistor 41 (FIGS. 1 to 10, 14 to 19).

In the configurations of the first, second, third and fourth exemplary embodiments of the present invention which have been described above, the installation method of the temperature sensor 8, the configuration method of the handles, the installation method of the menu selection unit 16, the configuration method of the menu selection unit 16, the configuration method of the knob connected to the menu selection unit 16 and the waterproof configuration method and the configuration method of the circuit unit 31 will be described below.

Installation Configuration of the Temperature Sensor 8

The temperature sensor 8 is installed contacting with the surface of the pot 1/the upper lid 2 so as to detect the surface temperature of the pot 1/the upper lid 2 (refer to FIGS. 5,6,8, 9 and 10).

The temperature sensor 8 is installed in such a way that the detection unit 33 of the temperature sensor 8 passes through the pot 1/the upper lid 2, thus directly detecting the temperature of vapor in the pot 1 (refer to FIGS. 5, 6, 8, 9 and 10).

The temperature sensor 8 may be configured to detect the temperature of vapor erupting from the pot 1 to the outside through the vapor erupting port 12 (FIGS. 1 and 2) or the temperature sensor 8 may be installed where vapor erupts, which erupts through a gap 13 between the pot body 3 and the upper lid 2.

Figure 8:
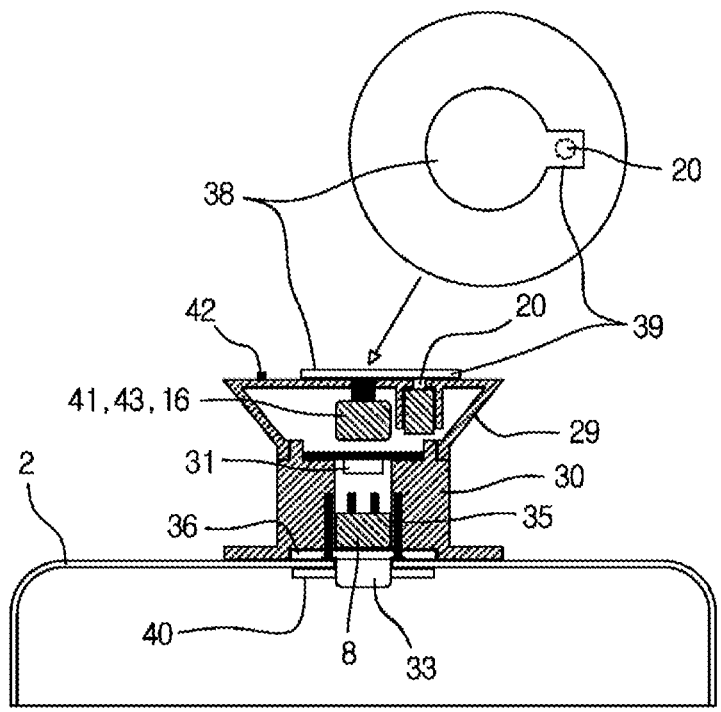
FIG. 8 is a side cross sectional view illustrating an operation wherein a handle wing opens and closes a sound passage hole and an operation wherein a temperature sensor is fixedly engaged using a threaded groove formed on an outer circumference of a detection unit installed passing through an upper lid according to still further another embodiment of the present invention.

The temperature sensor 8 may be configured in such a way that a temperature sensor wing 36 is fixed at the lower surface of the upper lid center handle 6, and the detection unit 33 of the temperature sensor 8 is fixedly engaged through a detection unit engaging screw 40 to the upper lid 2 using a threaded groove 34 formed on the outer circumference of the detection unit 33 (FIG. 8).

Figure 9:
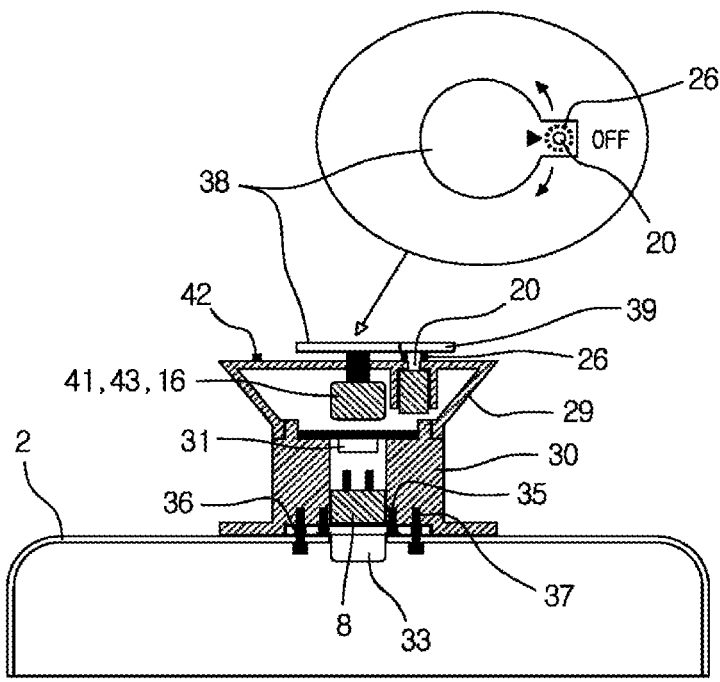
FIG. 9 is a side cross sectional view illustrating an operation wherein a rubber ring is installed at a periphery of a sound passage hole and an operation wherein a temperature sensor is installed using a handle fixing bolt according to still further another embodiment of the present invention.

The temperature sensor 8 may be configured in such a way that the temperature sensor wing 36 is fixed on a lower surface of the upper lid center handle 6, and the upper lid center handle 6 is engaged to the upper lid 2 using a handle fixing bolt 37 with the detection unit 33 passing through over the upper lid 2 in the inner direction of the pot 1, thus fixing the temperature sensor 8 (FIG. 9).

Figure 10:
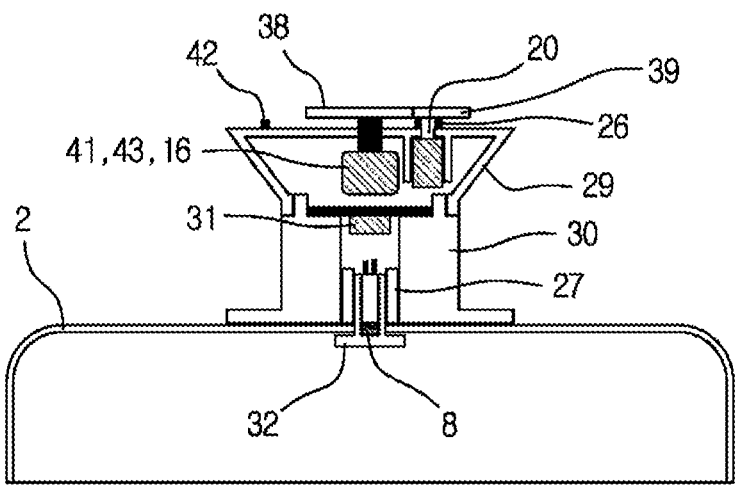
FIG. 10 is a side cross sectional view illustrating an operation wherein a temperature sensor is installed inside a hollow bolt used to fix a handle according to still further another embodiment of the present invention.

The temperature sensor 8 may be configured in such a way that it is installed on a lower surface portion of the bolt head in the hollow space inside the handle fixing bolt 37 which is engaged passing through the upper lid 2 to the handle fixing female screw 27 installed at the upper lid center handle 6 (FIG. 10).

Kinds of Temperature Sensor 8

The temperature sensor 8 may be formed of either a bimetal switch or a semiconductor temperature element. If the temperature sensor 8 is formed of a semiconductor element, for example, a thermistor, it may be configured to detect temperature in such a way that the circuit unit 31 formed of a microcomputer reads any changes in the resistance value of the semiconductor temperature sensor and compares with the temperature-resistance characteristic data of the semiconductor temperature element stored in the memory.

If the temperature sensor 8 is formed of a bimetal temperature sensor, it needs to select a temperature sensor 8 with an operation temperature value wherein the operation temperature of the temperature sensor 8 can detect the boiling of the water 17 based on each installation method of the temperature sensor 8. In this case, it may not need to install a separate microcomputer so as to detect any boiling.

Configuration of Sound of a Sound Generation Unit 11

The sound of the sound generation unit 11 may be configured in such a way that the circuit unit 31 equips with a recording unit, thus allowing the sound generating upon the completion of a cooking to be a sound corresponding to an actually recorded sound. Here, the recorded sound may be a sound that a user records or may be a sound that a manufacturer records. The sound may be a sound for advertisement. The sound that the user records may be a sound that the user directly downloads on the internet. The method for recording using a microcomputer is a known technology.

Waterproof of a Sound Generation Unit 11

Figure 11:
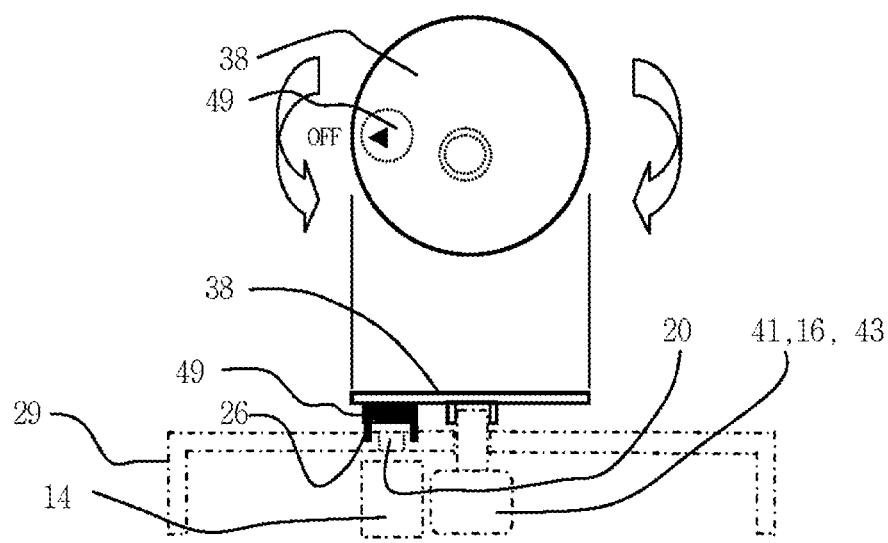
FIG. 11 is a key component side cross sectional view illustrating a configuration wherein a knob protrusion plate is provided to open and close a sound passage hole according to an exemplary embodiment of the present invention.

The sound generation unit 11 formed of a speaker 14 and a sound passage hole 20 may be configured in such a way that the sound passage hole 20 can be opened or closed for waterproof by means of movement of a knob wing 39 (FIGS. 7 and 8) of the knob which operates in sync with the power switch 43 or movement of the knob protrusion plate 49 (FIG. 11).

The sound generation unit 11 may be configured for waterproof in such a way that a rubber ring 26 is installed at a periphery of the sound passage hole 20, and the knob wing 39 of the knob operating in sync with the power switch 43 contact close with the rubber ring 26 while being positioned where the rubber ring 26 positions when setting the knob 38 at the off position of the menu plate 21, thus opening or closing the sound passage hole 20 (FIGS. 9,10).

In another configuration, the sound generation unit 11 may be configured for waterproof in such a way that the rubber ring 26 is installed at a periphery of the sound passage hole 20, and the knob protrusion plate 49 of the knob 38 contacts close with the rubber ring 20 when the knob 38 is set at the off position of the menu plate 21, thus opening or closing the sound passage hole 20 (FIG. 11).

The knob wing 39 may be configured in such a way that the know protrusion plate 49 is installed at a locking button type power switch 43 of an up and down movement method so as to open or close power. In this case, the sound passage hole 20 may be opened or closed based on the varying height of the button knob 38 when being opened or closed.

In another configuration, the sound generation unit 11 may be configured in such a way that the sound passage hole 20 is blocked by a thin plate 28 which allows sound to pass while preventing the pass of water (refer to FIGS. 1 to 6). The thin plate 28 may be made from a material with a thin thickness for the sound pressure (sound) of sound vibration to pass. As further another configuration, the thin plate 28 may be configured integral on the handle structure. In this case, it is preferred that the thin plate 28 is made from a material and in a structure wherein the number of the natural vibrations of the thin plate 28 has the number of the natural vibrations which may resonate with the sound vibrations of the speaker 14.

Configuration of a Menu Selection Unit 16

The menu selection unit 16 may be formed of a variable resistor 41 (refer to FIGS. 1 to 10, 14 to 17).

In another configuration, the menu selection unit 16 may be formed of a program of the circuit unit 31 equipping with a microcomputer, and menu selection buttons 44 (refer to FIGS. 20, 21, 22, 23).

Configuration of a Power Switch

The power switch 43 may be provided separate or may be configured integral with the variable resistor 41, thus operating in sync with the operation of the variable resistor 41.

Cooking Materials

The cooking material 18 used in the present invention may be various, for example, noodles, vegetables, meat, fish, etc. In the present invention, it may be a broth cooking wherein a broth may remain after the completion of the cooking.

Operations

First Exemplary Embodiment

Figure 12:
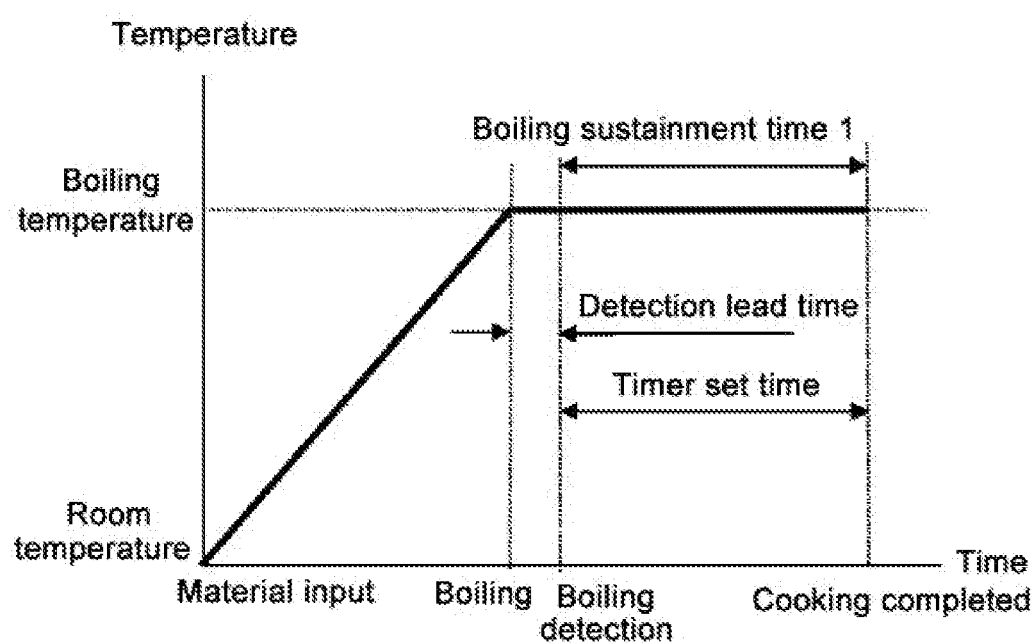
FIG. 12 is a cooking characteristic graph based on the input of a cooking material before water boils according to a first exemplary embodiment of the present invention.

The operations of the first exemplary embodiment will be described with reference to FIGS. 5, 6, 8, 9 and 10 showing the examples wherein the temperature sensor 8 is installed passing through the pot upper lid 2, FIG. 12 showing a characteristic graph of the first exemplary embodiment, and FIG. 14 showing an example of the circuit wherein the menu selection unit 16 is formed of the variable resistor 41.

The operations of the first exemplary embodiment of the present invention will be described.

1. Step for selecting a cooking menu by operating the menu selection unit 16.

Water 17 and the cooking material 18 are inputted into the pot 1 and is placed on a heating device, and the cooking menu is selected using the menu selection unit 16. As illustrated in FIG. 14, if the menu selection unit 16 is formed of a variable resistor 41, the knob 38 is set where the cooking menu of the menu plate 21 is displayed by operating the knob fixed at the variable resistor 41.

Figure 18:
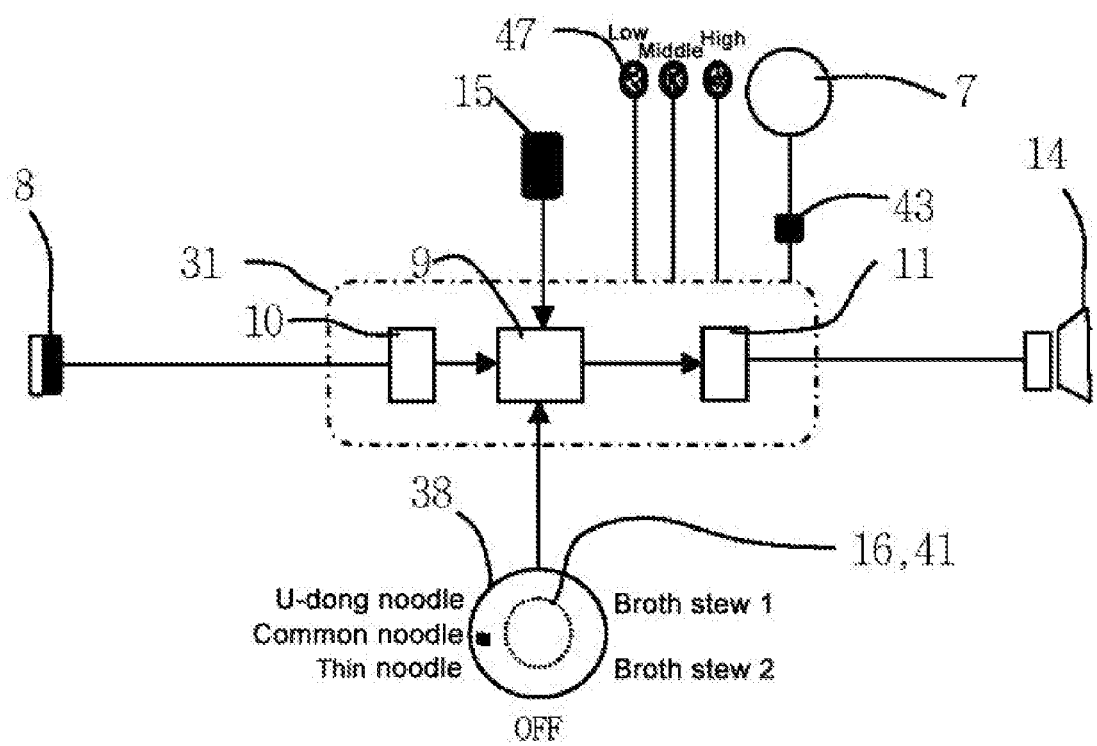
FIG. 18 is a view illustrating a circuit configuration when a cooking adjusting unit of the first and second exemplary embodiments of the present invention is formed of a microcomputer.
Figure 19:
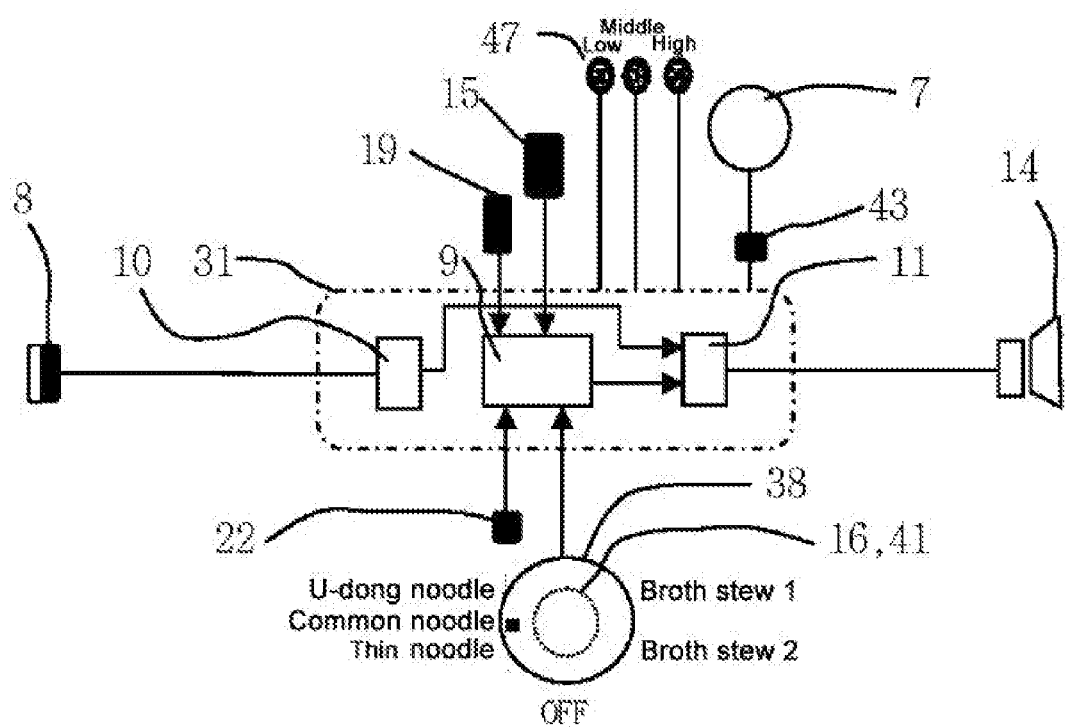
FIG. 19 is a view illustrating a circuit configuration when a cooling adjusting unit according to the third exemplary embodiment of the present invention is formed of a microcomputer.

As illustrated in FIG. 18, if the menu selection unit 16 is formed of the menu selection button 44, the power supply can start by operating the power switch 43. The menu is selected by letting the menu indication LED 46 at the cooking menu position to blink while opening the number of pressings of the menu selection button 44 while observing the blinking of the menu indication LED 46.

In case of a configuration wherein the power switch 43 is built in the variable resistor 41 of the menu selection, and the power switch 43 is configured to operate in sync with the operation of the variable resistor 41, when the knob 38 is rotated for the menu selection, the power switch 43 operates in sync, so the power supply to the circuit unit 31 can be automatically performed only with the rotation of the knob 38 for the menu selection.

2. Step wherein the "boiling sustainment time 1" value of the menu selected among the "boiling sustainment time 1" values previously measured for each menu is set on timer unit 9.

The "boiling sustainment time 1" value of the menu selected based on the operation of the menu selection unit 6 in the first step is set at the timer unit 9 (FIG. 12).

The "boiling sustainment time 1" values for each menu are made into a data form since with the cooking material 18 being previously inputted in water (at room temperature) before the water 17 boils, the "boiling sustainment time 1" (a time from the detection of boiling to the completion of the cooking) values are previously and experimentally measured. If the circuit unit 31 is formed of a microcomputer, the data are obviously stored in the memory of the circuit unit 31.

If the circuit unit 31 is formed of a microcomputer, and the menu selection unit 16 is formed using the variable resistor 41, the menu may be selected by rotating the knob 38 fixed at the variable resistor 41 in FIG. 14. The CPU of the circuit unit 31 reads the resistance value of the variable resistor 41, and a time value corresponding to the resistance value of the variable resistor 41 is extracted and set on the timer unit 9.

The method for determining the time value to be set on the timer unit 9 using the variable resistor may be various, and such technologies correspond to the known technologies.

3. Step wherein the time value set on the timer unit 9 can be adjusted within a predetermined range by the cooking adjusting unit 15.

In case of the same menu, according to the personal preference, there may be a well-done cooking and a rare cooking. When the user's preference may be adjusted using the cooking adjusting unit 15, the time value set on the timer unit 9 may be adjusted to increase or decrease in the second step within a predetermined range. The cooking adjusting unit 15 with such a function may be formed of another variable resistor and may be connected in series to the variable resistor 4 for the menu selection unit 16. In this case, to the resistance value of the variable resistor 41 for the menu selection unit 16, the resistance value based on the variable resistance for the cooking adjusting unit 15 may be consequently added, thus determining the time which will be set on the timer unit 9. Therefore, the time value set on the timer unit 9 may be adjusted to increase or decrease in such a way to adjust the variable resistance for the cooking adjusting unit 16.

If the cooking adjusting unit 15 is formed of the cooking adjusting button 45 as illustrated in Figure in FIG. 18, the cooking adjustment may be performed while operating the number of the pressings of the cooking adjustment button 45 so that the cooking adjustment indication LED 47 blinks at the position that the user wants while observing the cooking adjusting indication LED 47.

4. Step for heating the pot 1 with the previously inputted cooking material 18 before water boils.

The menu is selected in the steps. The cooking level is adjusted. The cooking materials 18 are previously inputted in the cold water 17 of the temperature (for example, room temperature) in the pot 1, and the pot 1 with the upper lid 2 being closed is heated by the heating device.

At this time, as the heating device used, the heating devices of all kinds of indirect heating methods may be available. Here, the indirect heating device includes a gas range, an electric range, etc.

5. Step wherein when the boiling detection unit 10 detects the boiling of the water 17 in the pot 1, a signal is outputted, and the operation of the timer unit 9 starts.

If the heating based on the step 4 continues, the water 17 in the pot 1 starts boiling. The boiling detection unit 10 with the temperature sensor 8 can detect the boiling of the water 17 in the pot 1.

The method wherein the temperature sensor 8 detects the boiling of the water 17 in the pot 1 with the aid of the temperature detection will be described.

Figure 3:
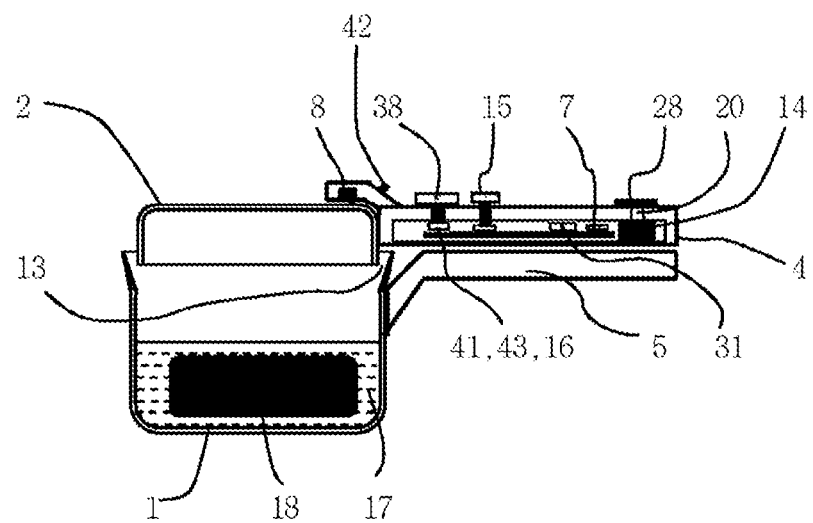
FIG. 3 is a side cross sectional view illustrating a configuration wherein a temperature sensor is configured to detect the temperature of an upper surface of a pot/an upper lid according to another exemplary embodiment of the present invention.
Figure 4:
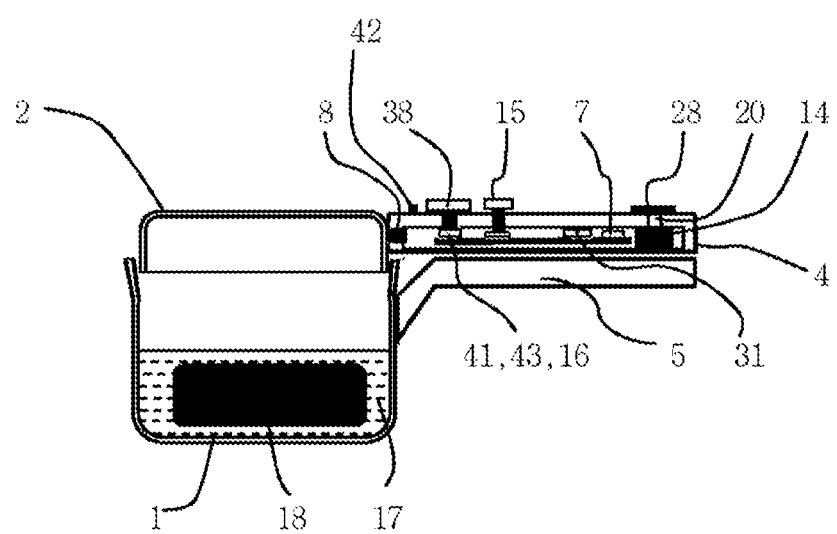
FIG. 4 is a side cross sectional view illustrating a configuration wherein a temperature sensor is configured to detect the temperature of an upper surface of a pot/an upper lid according to further another exemplary embodiment of the present invention.
Figure 5:
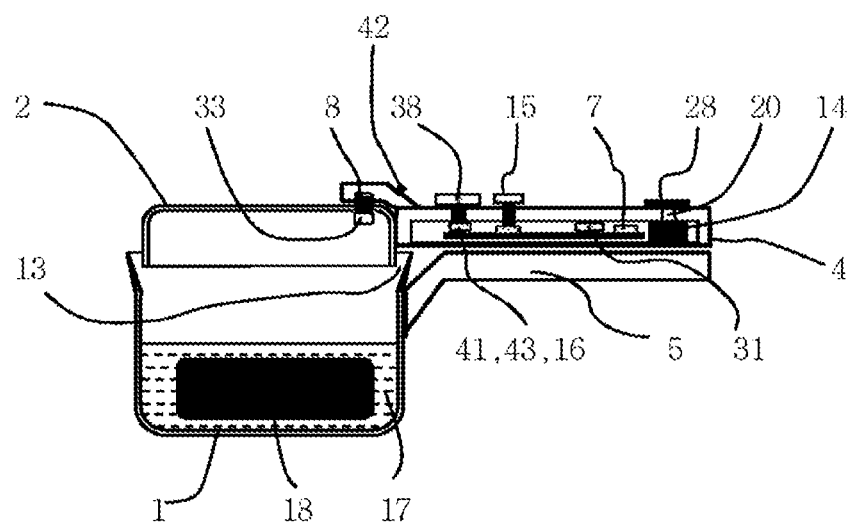
FIG. 5 is a side cross sectional view illustrating a configuration wherein a temperature sensor is installed passing through an upper surface of a pot/an upper lid according to still further another exemplary embodiment of the present invention.
Figure 6:
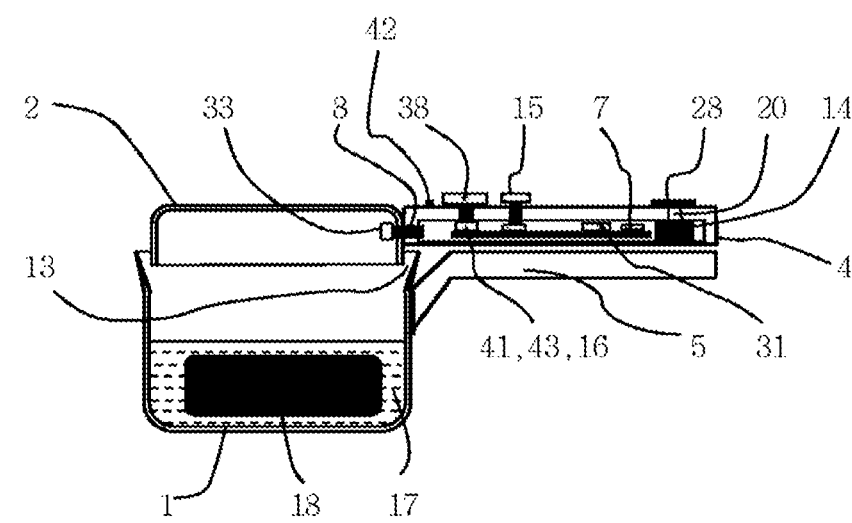
FIG. 6 is a side cross sectional view illustrating a configuration wherein a temperature sensor is installed passing through a side surface of a pot/an upper lid according to still further another exemplary embodiment of the present invention.
Figure 7:
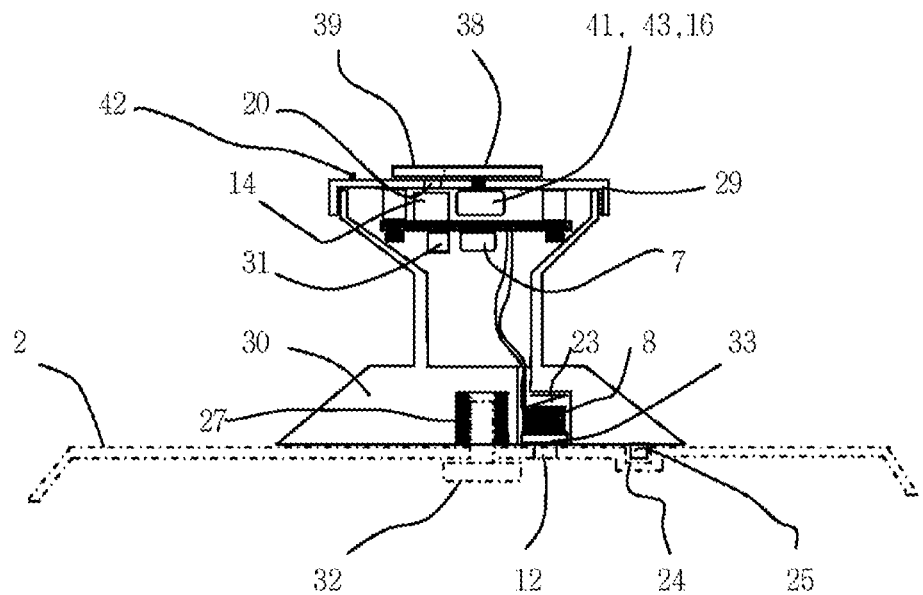
FIG. 7 is a side cross sectional view illustrating a configuration wherein a temperature sensor is installed at a lower surface of a handle for the center of an upper lid according to still further another exemplary embodiment of the present invention.

The boiling may be detected by detecting the surface temperature of the upper lid 2. Namely, as illustrated in FIGS. 3, 4 and 7, the temperature sensor 8 is installed contacting with the surface of the pot upper lid 2 so as to detect the surface temperature of the upper lid 2 of the pot 1 when the water 17 is boiling, thus indirectly detecting the boiling of the water 17. The surface temperature of the upper lid 2 when the water 17 in the pot 1 boils can be experimentally and previously measured. It is preferred to use the temperature sensor 8 having an operative temperature range value high enough to accurately detect the boiling ay any situation in consideration of the temperature deviations of the temperature sensors 8 which are mass produced and are available.

Figure 2:
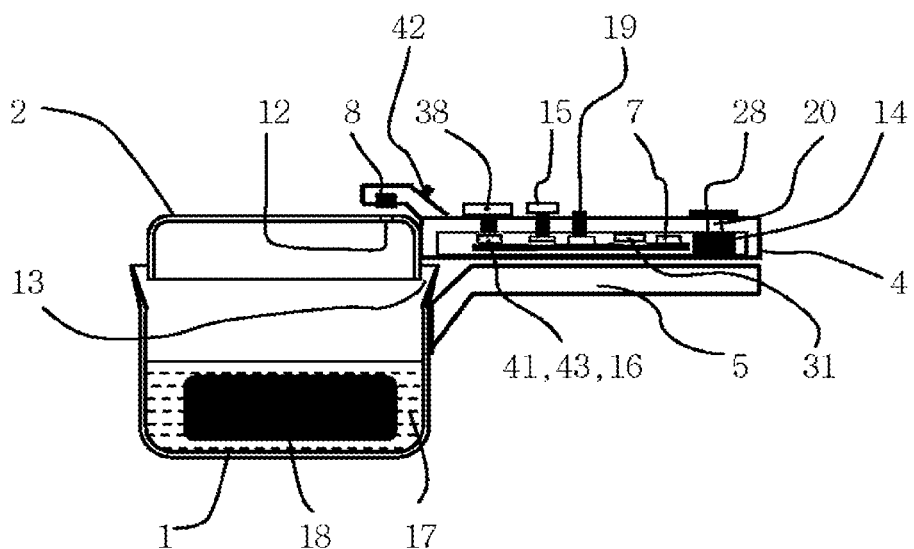
FIG. 2 is a side cross sectional view illustrating a configuration wherein a temperature sensor is configured to detect the temperature of vapor erupting from a vapor erupting port according to a second exemplary embodiment of the present invention.

In another configuration, as illustrated in FIGS. 1 and 2, the temperature of the vapor erupting to the outside from the vapor erupting port 12 of the pot 1/the upper lid 2 during the boiling is detected using the temperature sensor 8, thus detecting the boiling of the water 17 in the pot 1. It is preferred that in this configuration method, the temperature sensor 8 may be installed where the erupting vapor is focused, not at the position spaced-apart from the surface of the pot.

In another configuration, the boiling of the water 17 in the pot 1 may be detected by installing the vapor erupting port 12 in a shape that the temperature sensor 8 blocks. In this case the temperature sensor 8 is installed outside the pot in such a way that the detection unit 33 bocks the vapor erupting port 12 installed at the upper lid 2 (FIG. 7).

6. Step wherein when time set on the timer unit 9 passes, the timer unit 9 outputs a signal to the sound generation unit 11, thus generating a cooking completion sound.

If a time ("boiling sustainment time 1") set on the timer unit 9 passes, the timer unit 9 outputs a signal to the sound generation unit 11, thus generating a sound which notifies the completion of the cooking. The sound generation unit 11 is a hardware or a software configured to generate a specific sound and is configured to generate sound through the connected speaker 14.

If the cooking material 18 is a ramen, the operation procedure according to the exemplary embodiment of the present invention, for example, will be described.

In FIG. 14, if the menu selection unit 16 is formed of a variable resistor 41, the kind of the ramen is selected by setting on the kinds of the ramen which will be cooked, among the kinds of the ramen indicated on the menu plate 21 by rotating the knob connected to the variable resistor 41. Then, the circuit unit 31 reads the resistance value of the variable resistor 41, and the time value corresponding to the resistance value set according to the above method is set on the timer unit 9, and the indication positions of the menu indicated on the menu plate 21 are determined so that the time value set on the timer unit 9 can be the "boiling sustainment time 1" of the selected menu (kinds of ramen).

If a user selects a "common noodle (menu 3)" among the u-dong noodle (menu 1), the thin noodle (menu 2) and the common noodle (menu 3) on the menu plate 21, the "boiling sustainment time 1" (a time from the detection of the boiling to the completion of the cooking with a material being inputted before the boiling of water) of the common noodle (menu 3) that is experimentally and previously measured and determined with respect to the "common noodle (menu 3)" is set on the timer unit 9.

It is preferred that the "boiling sustainment time 1" of the "common noodle (menu 3)" in the first embodiment is about 3 minutes 30 seconds. Here, the "common noodle (menu 3)" means the kinds of ramen on the packing of which there is an indication "please boil about 4 minutes 30 seconds after the ramen is inputted in boiling water", and it is the kind of ramen which most sells in Korea.

According to the cooking method indicated on the surface of the packing of the "common noodle", it is indicated that the ramen in general is boiled 4 minutes 30 seconds after the ramen is inputted after water boils. However, the present first embodiment differs a little from the cooking method on the ramen packing because the ramen is previously inputted before the water boils. Therefore, the "boiling sustainment time 1" which is a lead time from the detection of the water boiling to the completion of the cooking under the cooking condition of the first embodiment is experimentally measured, and a result of the measurement is preferably shorter than the time value indicated on the conventional ramen packing. According to a result of the experiment performed by the applicant of the present invention, the "boiling sustainment time 1" of the "common noodle" (brand name: Shin Ramen, Ahanshung ramen, etc.) may be preferably selected according to the user's preference between about 3 minutes to 4 minutes.

As illustrated in FIG. 20, in the present invention, if the circuit unit 31 is formed of a microcomputer, the menu may be selected by letting the menu indication LED 46 at a desired menu position blink by pressing multiple times the menu selection button 44. Then, the microcomputer searches the "boiling sustainment time 1" of the selected menu on the memory of itself, thus setting on the timer unit 9 (timer program).

The cooking adjusting procedure based on a user's preference will be described below.

As illustrated in FIGS. 1 to 6, the cooking adjusting unit may be formed of a separate variable resistor. The technology for adjusting the time set on the timer unit 9 using the change in the resistance value of the variable resistor is a known technology. If the timer unit 9 is formed of an analog type timer (for example, 555 timer IC) using the charging and discharging of the resistor and a condenser, the time set on the timer unit 9 may be easily adjusted by connecting in series the variable resistor for the cooking adjusting unit 15 to the variable resistor 41 for the menu selection unit 16.

The menu selection and cooking adjustment may be obtained together using only one variable resistor 41, not providing a separate cooking adjustment unit 15. More specifically, as illustrated in FIG. 14, the user may adjust to the "low" side a little the knob 38 at the menu indication position of the menu plate 21 so as to designate a specific menu, thus adjusting for the set time value to decrease for the sake of the selected menu set on the timer unit 9. If when it is adjusted a little to the "high" side, it is possible to adjust for the set time value to increase. If the menu is a "common noodle", it is appropriate that the change in the time based on the adjustment based on a user's preference is preferably within about 1 minute.

As illustrated in FIG. 18, if the circuit unit 31 is formed of a microcomputer, it allows the cooking adjusting indication LED 47 at a desired cooking adjusting position to blink by pressing multiple times the cooking adjusting button 45. Then, a previously designated time value corresponding to the turned-on cooking adjusting indication LED 47 is searched from the memory, and it is programmed to adjust the time set on the timer unit 9 to be adjusted in such a way to increase or decrease by the searched time value the time set on the timer unit 9.

In the above manner, the menu is selected, and the time is set on the timer unit 9, and the cooking adjustment based on a user's preference is completed. Thereafter, the user starts heating by placing on a heating device the pot 1 into which a ramen of the cooking material 18 was previously inputted together with the water 17 of a room temperature.

The operations after the heating was started will be described below.

As the heating continues, the water 17 in the pot 1 boils, and the temperature sensor 8 detects the boiling, and the boiling detection unit 10 outputs a boiling detection signal. If the temperature sensor 8 is formed of a bimetal temperature switch, and as illustrated in FIGS. 1 and 2 is installed where the temperature of the vapor erupting from the vapor erupting port 12, the temperature sensor 8 is activated with the temperature of the vapor generating during the boiling, thus detecting the boiling of the water 17 in the pot 1. An operation signal (for example, a contact point change) of the temperature sensor 8 is transmitted to the timer unit 9, which allows the timer unit 9 to start.

As illustrated in FIGS. 3 and 4, if the temperature sensor 8 is configured to detect the surface temperature of the pot 1/the upper lid 2 since it is installed contacting with the surface of the upper lid 2 of the pot 1, the temperature sensor 8 is selected and installed, which has an operation temperature at the surface temperature of the pot 1/the upper lid 2 at the time the water 17 in the pot 1 boils. An operation signal of the temperature sensor 8 operating when the boiling is detected is transmitted to the timer unit 9, so the timer unit 9 starts to operate.

As illustrated in FIGS. 5, 6, 8 to 10, if the temperature sensor 8 is installed passing through the pot 1/the upper lid 2, the water 17 in the pot 1 boils, so vapor generates. The temperature sensor 8 detects the temperature of the vapor in the pot 1 when the water 17 boils, whereupon it starts to operate as the boiling of the water 17 is detected. An operation signal based on the detection of boiling of the temperature sensor 8 is transmitted to the timer unit 9, so the timer unit 9 starts to operate.

If the temperature sensor 8 is formed of a semiconductor temperature sensor like a thermistor, the program of the boiling detection nit 10 inside the microcomputer of the circuit unit 31 reads a resistance value of the semiconductor temperature sensor and compares with the temperature-resistance value data of the semiconductor temperature sensor, thus detecting the temperature. When the resistance value of the semiconductor temperature sensor when the water 1 boils is detected, it is determined as a boiling. The program of the boiling detection unit 10 outputs a signal, the operation of the timer unit 9 starts. The semiconductor temperature sensor may be installed on the surface of the pot 1/the upper lid 2 or near the vapor erupting port 12 or at a portion that passes through the pot 1/the upper lid 2.

When the timer unit 9 starts to operate, the set time (for example, a discount) is measured, and when the time set on the timer unit 9 all passes, a signal is outputted. The sound generation unit 11 generates a sound in accordance with an output signal from the timer unit 9, and that the selected cooking has been completed optimum based on an individual preference is notified to the user in a form of an alarm sound.

As described so far, the first embodiment is featured to notify to the user in a form of an alarm sound that the cooking is completed optimum after a cooking material 18 of the cooking wherein a broth remains after the completion of the cooking is previously inputted before water boils.

Second Exemplary Embodiment

The second exemplary embodiment is an embodiment wherein the cooking material 18 is inputted after water boils. It is configured to inform the input timing of the cooking material 18.

The operation of the second exemplary embodiment is as follows.

1. Step for selecting a cooking menu by operating the menu selection unit 16.

The operation procedures of the present step is same as the first exemplary embodiment.

2. Step wherein the time obtained by adding the "input lead time" of the material to the "boiling sustainment time 2" of the selected menu is set on the timer unit 9.

Figure 13:
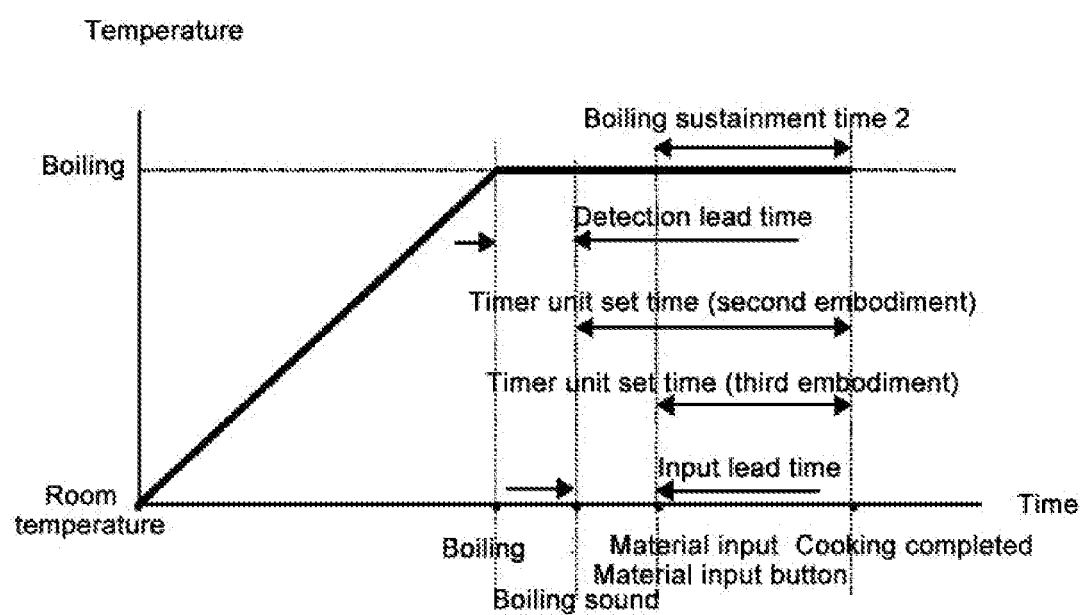
FIG. 13 is a cooking characteristic graph based on the input a cooking material after water boils according to second and third exemplary embodiments of the present invention.

The time obtained by adding the "input lead time" of the material the "boiling sustainment time 2" of the selected menu based on the selection of the menu is set on the timer unit 9 (FIG. 13). The method and procedure for setting a corresponding time of the selected menu based on the operation of the menu selection unit 16 is set on the timer unit 9 are same as the first exemplary embodiment.

3. Step wherein a time value set on the timer unit 9 is adjusted within a predetermined time range by the cooking adjusting unit 15.

The operation procedure wherein the time set on the timer unit 9 is adjusted based on the operation of the cooking adjusting unit 15 is same as the first exemplary embodiment.

4. Step for heating the pot 1 filled with the water 17.

The pot 1 filled with the water 17 is heated. The heating device which will be used is same as the above first exemplary embodiment.

5. Step wherein when the boiling of the water 17 in the pot 1 is detected, the boiling detection unit 10 outputs a signal to the sound generation unit 11 and the timer unit 9, thus generating a boiling sound which notifies the boiling, and the cooking material 18 is inputted, and the operation of the timer unit 9 starts.

When the boiling detection unit 10 detects the boiling of the water 17 in the pot 1, a signal is outputted to the sides of the sound generation unit 11 and the timer unit 9, thus generating a boiling sound which notifies the boiling of the water 17, and at the same time, the operation of the timer unit 9 starts.

The boiling detection operation procedure of the boiling detecting unit 10 is same as the above embodiment 1.

In accordance with the boiling sound signal which notifies the boiling of the water 17 in the pot 1, the user inputs the prepared cooking material 18 into the boiling water 17 of the pot 1. Thereafter, the upper lid 2 of the pot 1 is closed.

After the operation of the timer unit 9 starts, it is preferred that the timer unit 9, which has been already operated, may be configured to continue to operate irrespective of the reoperation of the temperature sensor 8 as the upper lid 2 is opened and closed. In this case, it does not matter if the cooking is performed with the upper lid 2 open after the cooking material 18 is inputted.

It is preferred that the cooking material 18 is immediately performed upon the generation of the boiling which notifies the boiling detection. It was observed that the "input lead time" for the input of the cooking material 18 was about 20~30 seconds in case of the cooking of ramen. Here, the cooking material 18 means a main cooking material, not sauces.

In the present step, if a restart button (not shown) is installed, when the restart button is activated, the timer unit 9, which has been already operated, restarts from the beginning in accordance with an operation signal of the restart button. The above restart button (not illustrated) may be usefully used in case where the cooking material 18 is inputted after a predetermined time passes without immediately inputting the cooking material 18 after a boiling sound has been generated, which notifies the boiling.

6. Step wherein when the time set on the timer unit 9 passes, the timer unit 9 outputs a signal to the side of the sound generation unit 11, thus generating a cooking completion sound.

When the time ("boiling sustainment time 2"+"input lead time") set on the timer unit 9 passes, the timer unit 9 outputs a signal to the side of the sound generation unit 11, thus letting the sound generation unit 11 generate a cooking completion sound. In this way, an alarm sound notifying the completion of the cooking to the user can be generated.

The kinds of sounds in this embodiment are same as the sound described in the first exemplary embodiment.

The second exemplary embodiment has features in that when the operation of the timer unit 9 starts, a boiling sound is generated, which is a function to notify the boiling of the water 17 to the user. In addition, the operation start of the timer unit 9 is notified to the user, which is a function to notify the user to input the cooking material 18 because the water is boiling. Another feature which is different from the first exemplary embodiment is that the cooking material 18 is inputted after water boils.

Third Exemplary Embodiment

The operation procedures of the third exemplary embodiment of the present invention will be described.

The third exemplary embodiment of the present invention is configured in such a way that the cooking material 18 is inputted after water boils.

The thing that the third exemplary embodiment differs from the second exemplary embodiment is that the operation of the timer unit 9 does not start if the material input button 19 is not operated, which allows the user to input the cooking material, even though the boiling sound is generated after the boiling of the water 17 is detected. Namely, the timer unit 9 starts reoperation when the boiling of the boiling detection unit 10 is redetected after the operation signal is outputted from the material input button 19.

The operation of the third exemplary embodiment of the present invention is as follows.

1. Step for selecting a cooking menu by operating the menu selection unit 16.

The operation procedures for selecting the menu are performed in the same way as in the first and second exemplary embodiments.

2. Step wherein the "boiling sustainment time 2" (a lead time from the input of the material to the completion of the cooking) of the selected menu is set on the timer unit 9.

The "boiling sustainment time 2" (a lead time from the input of the cooking material into a boiling water to the completion of the cooking) value of the menu selected based on the menu selection in the first step is set on the timer unit 9. The procedure for setting time on the timer unit 9 is same as in the above first and second exemplary embodiments.

3. Step wherein the time value set on the timer unit 9 is adjusted within a predetermined time range by the cooking adjusting unit 15.

The time set on the timer unit 9 can be adjusted within a predetermined range by adjusting the cooking adjusting unit 15 based on an individual preference. The operation procedure for adjusting the time set on the timer unit 9 with the aid of the operation of the cooking adjusting unit 15 is same as in the above first and second exemplary embodiments.

4. Step for heating the pot 1 filled with the water 17.

The pot 1 filled with the water 17 is placed on a heating device and is heated. The kinds of the heating devices are same as in the above first exemplary embodiment.

5. Step wherein when the boiling detection unit 10 detects the boiling of the water 17 in the pot 1, a signal is outputted, and the sound generation unit 11 generates a boiling sound.

When the boiling detection unit 10 detects a boiling, a signal is outputted to the side of the sound generation unit 11, and the sound generation unit 11 generates a boiling sound to notify the boiling of the water 17.

6. Step wherein the cooking material 18 is inputted based on the boiling sound, and when the material input button 19 is operated, the boiling state of the boiling detection unit 10 is rechecked in accordance with an operation signal of the material input button 19, and when the boiling detection signal is redetected, the timer unit 9 starts to operate.

In the fifth step, when a boiling sound notifying the boiling is generated, the user inputs the cooking material 18 into the pot 1. When the user operates the material input button 19 to notify the input of the material, the boiling detection state of the boiling detection unit 10 is rechecked in accordance with an operation signal of the material input button 19, and when the boiling signal of the boiling detection unit 10 is redetected, the timer unit 9 starts to operate.

Namely, when operating the material input button 19, the boiling detection state of the boiling detection unit 10 is rechecked, and when the boiling of the water 17 is redetected, the timer unit 9 starts to operate. In this way, the "boiling sustainment time 2" of the inputted cooking material 18 can accurately apply even though a lot of time has been consumed until the temperature of the boiled water 17 ascends again after it has over descended since the cooking material 18 is over inputted as compared with the amount of the water 17.

If any change in the temperature of the water 17 due to the inputted cooking material 18 is a cooking material (for example, a cooking material for one ramen) small enough to be neglected, the timer unit 19 may be configured to start to operate without checking the boiling state of the water 17 when the material input button 19 is operated because the time until the temperature of the boiled water 17 ascends again after it has descended after the cooking material 18 is inputted is short enough to be neglected. It is obvious that this occasion is also included in the scope of the present invention.

7. Step wherein when a time set on the timer unit 9 passes, the timer unit 9 outputs a signal to the side of the sound generation unit 11, thus generating a cooking completion sound.

When a time set on the timer unit 9 all passes, the timer unit 9 outputs a signal to the sound generation unit 11. To this end, the sound generation unit 11 generates a cooking completion sound and notifies the user that the cooking has been completed.

The sound of the present embodiment is same as the sound as in the above first embodiment.

Fourth Exemplary Embodiment

The operations of the fourth exemplary embodiments are as follows.

The cooking amount detection unit 48 may be formed of a cooking amount selection switch 22. In another method, it may be configured in such a way that the circuit unit 31 formed of a microcomputer measures a lead time from the turned on time of the power switch operating when the heating starts to the detection of the boiling of the water 17 in the pot 1, thus determining the amount of the cooking.

The fourth exemplary embodiment of the present invention is useful when it needs to input a noodle material is previously inputted before the water 17 boils. The decrease amount of the "boiling sustainment time 1" based on the increase in the amount of the noodle cooking material may be previously and experimentally measured and stored in a form of data.

The operation method of the fourth exemplary embodiment is as follows.

1. Step wherein a cooking menu is selected by operating the menu selection unit 16, and when the heating starts, the power switch is turned on, and the heating of the pot 1 filled with the cooking material 18 starts.

The cooking menu is selected by operating the menu selection unit 16. The method and operation procedures for selecting the menu are same as in the above first embodiment. The heating of the pot 1 in which the cooking material 18 is inputted starts immediately after the menu selection. The power switch may be configured to automatically turn on in sync with the operation of the menu selection unit 16.

2. Step wherein the "boiling sustainment time 1" of the selected menu is set on the timer unit 9.

When the menu is selected by operating the menu selection unit 16, the "boiling sustainment time 1" of the selected menu is set on the timer unit 9. The operation procedures wherein the "boiling sustainment time 1" of the selected menu is set on the timer unit 9 is same as in the above first embodiment.

3. Step wherein the time value set on the timer unit 9 is adjusted within a predetermined time range by the cooking adjusting unit 15.

The time set on the timer unit 9 can be adjusted by operating the cooking adjusting unit 15. The operation procedures wherein the time set of the timer unit 9 is adjusted are same as in the first embodiment. The heating of the pot 1 in the first step may be executed in the first step, the second step or the third step. There will not be any difference in actual applications even though the heating is performed in any of the first, second and third steps. Each occasion will be obviously included in the scope of the present invention.

4. Step wherein the cooking amount detection unit 48 measures the lead time from the moment the power switch 43 is turned on to the generation of the boiling detection signal of the boiling detection unit 10, thus determining the amount of the cooking.

In case where the power switch 43 is configured integral with the menu selection variable resistor 41 and operates in sync, the power switch 43 is turned on in the course the knob 38 of the menu selection unit 16 is rotated in the first step.

If the power switch is installed separate, the separate power switch 43 is turned on when the heating of the pot starts.

When the power supply to the circuit unit 31 starts, the cooking amount detection unit 48 starts to operate, and a time measurement starts, and for the time measurement, the lead time from the moment the power switch is turned on to the moment the boiling detection unit 10 detects a boiling is measured, thus detecting the amount of the cooking.

If the cooking is a ramen cooking, the amount of the cooking may be indirectly measured in such a way that the lead time is measured by considering that the lead time from the moment the heating starts to the moment the water 17 starts to boil is almost two times because the amount of water is almost two times when two pieces of ramen are cooked as compared to the amount of the water when one ramen is inputted. However, since the menu selection operation starts just upon the start of the heating or the heating starts immediately after the operation of the menu selection, the power switch 43 is turned on, which operates in sync with the menu selection during the above procedure, so the moment the power switch 43 is turned on may be regarded as a heating start moment. To this end, the cooking amount detection unit 48 is performed for the time until the generation of the boiling detection signal by measuring the time from the supply of the power in this step, thus detecting the amount of the cooking.

If the cooking amount detection unit 48 is formed of a cooking amount selection switch 22, the amount of the cooking may be determined in such a way to detect the contact point position of the cooking amount selection switch 22 instead of measuring the time of the cooking amount detection unit 48. The cooking amount selection switch 22 may be configured to select the amount of the cooking based on a contact point change of the switch, for example, a cooking for one person (one piece), a cooking for two persons (two pieces), a cooking for three persons (three pieces), etc.

5. Step wherein a time (boiling sustainment time 1) previously set on the timer unit 9 in accordance with a cooking amount information signal of the cooking amount detection unit 48 is adjusted within a predetermined range based on the data which are previously and experimentally measured.

The "boiling sustainment time 1" previously set on the timer unit 9 is adjusted when selecting the menu in accordance with a cooking amount information signal of the cooking amount detection unit 48. In case where the "boiling sustainment time 1" is a data measured based on a cooking for one person (one piece), if the cooking is for two persons due to the increase in the amount of the cooking, the "boiling sustainment time 1" decreases by the time which was previously and experimentally measured. If the cooking material 18 is a "common noodle", when two pieces of ramen are previously inputted and cooked, it is preferred in the inventor's opinion that the "boiling sustainment time 1" is decreased within a range of about 30 seconds to 1 minute as compared to when the ramen is one in number. If the cooking material 18 is not a noodle cooking, there will be no problem in actual application even though any adjustment is not made to decrease the "boiling sustainment time 1" based on the increase in the amount of the cooking because the increase in the time that the common cooking materials except for the noodle cooking is submerged in water of a temperature before the boiling does not have effect on the speed of the cooking in actual application. In case of the cooking material 18 on which the time that the material is submerged in the water 17 before the boiling like the noodle cooking has effect, it is preferred that the "boiling sustainment time 1" decreases based on the increase in the amount of the cooking.

6. Step wherein the timer unit 9 starts to operate in accordance with a signal when the boiling detection unit 10 detects a boiling of the water 17.

When the boiling detection unit 10 detects a boiling of the water 17 and outputs a signal, the timer unit 9 starts to operate and measure the set time.

7. Step wherein when the time set on the timer unit 9 passes, a signal is outputted to the side of the sound generating unit 11, thus generating a cooking completion sound.

If the timer unit 9 starts to operate and a set time all passes, a signal is outputted to the side of the sound generating unit 11. To this end, the sound generating unit 11 generates a cooking completion sound.

The kinds of the sounds of the present embodiment are same as the kinds of the sounds in the first embodiment.

If the cooking amount detection unit 48 is formed of a cooking amount selection switch 22, the cooking may proceed in the following operation method.

In this case, the amount of the cooking menu is selected by operating the cooking amount selection switch 22. When the menu is selected, the time set on the timer unit 9 may be adjusted based on the selection of the cooking amount selection switch 22. With the amount of the cooking increased, if the cooking amount selection switch 22 is selected, the time set on the timer unit may be previously adjusted to decrease based on the data on a change in the boiling time on the basis of the cooking amount.

In the first to fourth embodiments of the present invention described so far, the waterproof operation procedure of the sound passage hole 20 of the sound generation unit 11 will be described.

The sound generating unit 11 may be configured for waterproof in such a way the sound passage hole 20 is opened or closed by movement of the knob wing 39 (FIGS. 7 and 8) of the knob or the knob protrusion plate 49 in sync with the power switch 43 (FIG. 11). To this end, when the knob is rotated so as to select a menu, the knob wing 39 in FIGS. 7 and 8 allows to open the sound passage hole 20. On the contrary, if the knob 38 is rotated to the off position and is set so as to stop the generation of the sound which is outputted after the completion of the cooking, the knob wing 39 closes the sound passage hole 20. If the pot 1 is washed with water, since the power of the present invention is in an off state, the sound passage hole 20 always remains closed due to the knob wing 39 during washing, it is possible to prevent any penetration of water through the sound passage hole 20 during washing.

If the knob protrusion plate 49 is formed like in FIG. 11, the sound passage hole 20 may be opened or closed by movement of the knob protrusion plate 49 formed on the lower surface of the knob 38.

The knob wing 39 or the knob protrusion plate 49 may be configured to be installed at the power switch 43 of the locking button method of the upward and downward motion type installed separate from the variable resistor 41. In this case, the sound passage hole 20 may be opened or closed using any change in the height of the button knob 38 when the power is turned on or off based on the number of the pressings of the power button. Namely, it may be configured that when the height of the knob 38 decreases, the knob wing 39 or the knob protrusion plate 49 closes the sound passage hole 20 and when the height increases, the sound passage hole 20 is opened.

For the perfect closing of the sound passage hole 20, a rubber ring 26 with an elasticity may be installed at a periphery of the sound passage hole 20. In this case, the sound passage hole 20 may have a waterproof since the knob wing 39 in FIGS. 9 and 10 or the knob protrusion plate 49 in FIG. 11 more completely contacts close with the rubber ring 26 having the elasticity. For better close contacts, the knob protrusion plate 49 may be made from an elastic material.

In another configuration for the waterproof of the sound passage hole 20, the sound passage hole 20 may be closed with a thin plate 28 which allows the sound from the sound generation unit 11 to pass, not letting the water pass (FIGS. 1 to 6). In this case, the thin plate 28 may be made from a thin material which may allow a sound vibration pressure of the speaker 14 to well pass through the thin plate 28, whereupon the sound of the speaker 14 passes through the thin plate 28, but the water does not pass, thus obtaining waterproof.

According to another method, the thin plate 28 may be configured integral with the handle structure. In this case, the natural frequency of the thin plate 28 may resonate to the sound vibration of the speaker 14, and sound passes through the thin plate 28, not passing through the water, thus obtaining waterproof.

The reference numbers not described will be describe as follows.

The spring 23 in FIG. 7 allows the temperature sensor 8 to contact close with the surface of the upper lid 2. The accurate close contact of the temperature sensor 8 allows to decrease any deviation in the detection of the temperature of the temperature sensor 8.

The protrusion 25 and the protrusion groove 24 in FIG. 7 allow the temperate sensor 8 not to separate from the position of the vapor erupting port 12 in FIG. 7.

The handle upper structure 30 and the handle lower structure 29 represent the upper and lower structures when the upper lid center handle 6 is formed into two pieces separable for the exchange of electric power.

The temperature sensor wing 36 allows the temperature sensor 8 to be easily installed at the handle of the pot.

The sensor wing fixing bolt 35 represents a bolt allowing to fixedly install the temperature sensor wing 36 at the upper lid center handle 6.

The power indication LED 42 has a function to show that power is on.

The body handle 5 represents a handle installed at sides of the body of the pot 1.

The upper lid side handle 4 represents a handle installed at sides of the upper lid 2.

FIG. 12, which is not descried, is a temperature-time characteristic graph when the cooking is performed in the method of the first embodiment in case the cooking material is previously inputted before the water 17 boils. In FIG. 12, the time of the "boiling" represents a moment water actually starts to boil, and the boiling detection time represents a moment the temperature sensor 8/the boiling detection unit 10 detects boiling.

The "boiling sustainment time 1" in FIG. 12 represents a lead time from the boiling detection of the boiling detection unit 10 to the completion of the cooking with the cooking material 18 being inputted before the water 17 starts to boil and is a time value set on the timer unit 9 as a set time value of the selected menu.

FIG. 13 is a temperature-time characteristic graph when the cooking is performed in the method of the second and third embodiments in case where the cooking material 18 is inputted after the water boils. In FIG. 13, the detection lead time is same as in FIG. 12. The input lead time represents a time from the generation of the boiling sound notifying the boiling to the moment the user inputs the cooking material 18. To this end, the time set on the timer unit 9 in the second embodiment is set a time obtained by adding the "input lead time" to the "boiling sustainment time 2", but since the "input lead time" is a time that the cooking material 18 is inputted into the water 17 in the pot 1, the time that the cooking material 18 is further cooked in the boiling water 17 is the "boiling sustainment time 2". The "boiling sustainment time 2" is a time from the input of the cooking material into the boiling water to the completion of the cooking.

FIG. 13 is a temperature time characteristic graph of the second and third embodiments. The material input time in FIG. 13 represents a time that the material input button 19 is operated. In FIG. 13, the moment wherein the temperature of the water 17 temporarily decreases after the input 18 of the material is not shown.

As described above, the embodiments of the present invention are directed to an automatic cooking pot which is able to automatically notify the user that a broth cooking is completed with the best taste.

The invention claimed is:

1. An automatic cooking pot notifying completion of cooking, comprising: a boiling detector which includes a temperature sensor; a timer, wherein the boiling detector is configured to transmit a boiling detection signal to the timer when boiling of a water in the pot is detected, wherein the boiling of the water in the pot is determined by a temperature measured by the temperature sensor and the temperature sensor is configured to directly measure a temperature of vapor erupting from an upper lid, and the timer starts to operate in accordance with the boiling detection signal; a cooking adjusting part which adjusts a timer setup time for a user's preference; a menu selection part which selects a cooking menu, wherein the menu selection part determines a set time of a "boiling sustainment time 1" by selecting the cooking menu and the "boiling sustainment time 1" is a constant time from the detection moment of boiling of the water to the completion moment of cooking and is stored in a memory for notifying completion of cooking, a sound generator which includes a speaker and a sound passage hole, wherein the timer transmits a signal to the sound generator when the set time passes in the timer, and the sound generator is configured to generate a signal sound in accordance with the signal of the timer to notify the completion of cooking; a pot handle; and a circuit, wherein the circuit is located inside the pot handle-a knob including a knob wing or a knob protrusion plate; a rubber ring, wherein the rubber ring is installed at a periphery of the sound passage hole, and a power switch, wherein the sound passage hole is configured such that the sound passage hole is opened or closed for waterproof by means of movement of a knob wing or movement of the knob protrusion plate which operates in sync with the power switch.

2. An automatic cooking pot notifying completion of cooking, comprising: a boiling detector which includes a temperature sensor; a timer, wherein the boiling detector is configured to transmit a boiling detection signal to the timer when boiling of a water in the pot is detected, wherein the boiling of the water in the pot is determined by a temperature measured by the temperature sensor and the temperature sensor is configured to directly measure a temperature of vapor erupting from an upper lid, and the timer starts to operate in accordance with the boiling detection signal; a cooking adjusting part which adjusts a timer setup time for a user's preference, wherein the menu selection part determines a set time by selecting the cooking menu, wherein the set time includes an "input lead time" and a "boiling sustainment time 2", wherein the "boiling sustainment time 2" is a constant time of the selected cooking menu and stored in a memory for notifying completion of cooking; a sound generator which includes a speaker and a sound passage hole, wherein the timer outputs a signal to the sound generator when the set time passes in the timer, and the sound generator is configured to generate a signal sound in accordance with the signal of the timer to notify the completion of cooking of the cooking material and is configured to generate a boiling signal sound in accordance with the boiling detection signal of the boiling detector; a restart button, wherein the timer restarts to count the set time when the restart button is pressed;

A pot handle a circuit, wherein the circuit is located inside the pot handle; a knob including a knob wing or a knob protrusion plate: a rubber ring, wherein the rubber ring is installed at a periphery of the sound passage hole; and a power switch, wherein the sound passage hole is configured such that the sound passage hole is opened or closed for waterproof by means of movement of a knob wing or movement of the knob protrusion plate which operates in sync with the power switch.

3. An automatic cooking pot notifying completion of cooking, comprising:

A boiling detector which includes a temperature sensor;

A timer, wherein the boiling detector is configured to transmit a boiling detection signal to the timer when boiling of a water in the pot is detected, wherein the boiling of the water in the pot is determined by a temperature measured by the temperature sensor and the temperature sensor is configured to directly measure a temperature of vapor erupting from an upper lid; a cooking adjusting part which adjusts a timer setup time for a user's preference; a menu selection part which selects a cooking menu;

a material input button which is configured to operate the timer to start after receiving the boiling detection signal regenerated by a boiling detector, wherein the menu selection part selects a set time of a "boiling sustainment time 2" of a selected cooking menu, wherein the "boiling sustainment time 2" is a constant time stored in a memory for notifying completion of cooking, and the timer outputs a signal when the set time passes after the operation of the material input button; a sound generator which includes a speaker and a sound passage hole, wherein the sound generator is configured to generate a boiling signal sound in accordance with the boiling detection signal and is configured to generate a cooking completion sound in accordance with the signal of the timer; a pot handle, and a circuit, wherein the circuit is located inside the pot handle; a knob including a knob wing or a knob protrusion plate: a rubber ring, wherein the rubber ring is installed at a periphery of the sound passage hole; and a power switch, wherein the sound passage hole is configured such that the sound passage hole is opened or closed for waterproof by means of movement of a knob wing or movement of the knob protrusion plate which operates in sync with the power switch.

* * * * *